US008838281B2

(12) United States Patent
Rombouts et al.

(10) Patent No.: US 8,838,281 B2
(45) Date of Patent: Sep. 16, 2014

(54) AUTOMATED DEMAND RESPONSE ENERGY MANAGEMENT SYSTEM

(71) Applicant: REstore NV, Antwerp (BE)

(72) Inventors: Jan-Willem Rombouts, Antwerp (BE); Jos Gheerardyn, Brugge (BE)

(73) Assignee: Restore NV, Antwerp (BE)

( * ) Notice: Subject to any disclaimer, the term of this patent is extended or adjusted under 35 U.S.C. 154(b) by 0 days.

(21) Appl. No.: 13/779,560

(22) Filed: Feb. 27, 2013

(65) Prior Publication Data

US 2013/0178993 A1 Jul. 11, 2013

Related U.S. Application Data

(62) Division of application No. 13/327,411, filed on Dec. 15, 2011, now Pat. No. 8,417,391.

(51) Int. Cl.
*G05B 13/02* (2006.01)
(Continued)

(52) U.S. Cl.
CPC ............. *G05B 13/02* (2013.01); *Y02E 40/76* (2013.01); *Y02E 60/76* (2013.01); *G06Q 40/04* (2013.01); *Y02E 70/3225* (2013.01); *H02J 3/14* (2013.01); *G06Q 50/06* (2013.01); *Y04S 10/54* (2013.01); *G06Q 10/04* (2013.01); *G06Q 10/06* (2013.01); *H02J 2003/007* (2013.01); *Y04S 20/222* (2013.01); *Y04S 40/22* (2013.01); *Y04S 10/545* (2013.01); *Y04S 10/58* (2013.01); *Y04S 50/00* (2013.01)
USPC ............ 700/291; 700/295; 700/296; 700/286

(58) Field of Classification Search
None
See application file for complete search history.

(56) References Cited

U.S. PATENT DOCUMENTS 4,341,345 A 7/1982 Hammer et al.
5,927,598 A 7/1999 Broe
(Continued)

FOREIGN PATENT DOCUMENTS

EP 1 176 690 A2 1/2002
JP 2003 116219 4/2003
(Continued)

OTHER PUBLICATIONS

Ghatikar, Girish, M.A. Piette, S. Fujita, A. T. McKane, J.Q Han, A. Radspieler, K.C. Mares, D. Shroyer. "Demand Response and Open Automated Demand Response Opportunities for Data Centers." California Energy Commission, PIER Program and Pacific Gas and Electric Company (PG&E)., Jan. 2010, 94 pages.

(Continued)

*Primary Examiner* — Kavita Padmanabhan
*Assistant Examiner* — Christopher E Everett
(74) *Attorney, Agent, or Firm* — Beyer Law Group LLP

(57) ABSTRACT

The power flexibility of energy loads are maximized using a value function for each load and outputting optimal control parameters per load. These loads are aggregated into a virtual load by maximizing a global value function that includes the value function for each individual load. The solution yields a dispatch function providing: a percentage of energy to be assigned to each individual load, a possible time-varying power level within a time interval for each load, and control parameters and values. An economic term of the global value function represents the value of the power flexibility to different energy players. A user interface includes for each time interval upper and lower bounds representing respectively the maximum power that may be reduced to the virtual load and the maximum power that may be consumed by the virtual load. An energy trader modifies an energy level in a time interval relative to the reference curve for the virtual load. Automatically, energy compensation for the other intervals and recalculation of upper and lower boundaries occurs and is displayed. The energy schedule for the virtual load is distributed to the actual loads using the dispatch function.

13 Claims, 23 Drawing Sheets

(51) Int. Cl.
*G06Q 40/04* (2012.01)
*H02J 3/14* (2006.01)
*G06Q 50/06* (2012.01)
*G06Q 10/04* (2012.01)
*G06Q 10/06* (2012.01)
*H02J 3/00* (2006.01)

(56) References Cited

U.S. PATENT DOCUMENTS

| | | |
|---|---|---|
| 6,681,155 B1 | 1/2004 | Fujita et al. |
| 7,161,329 B2 | 1/2007 | McLoughlin et al. |
| 7,216,021 B2 * | 5/2007 | Matsubara et al. ........... 700/295 |
| 7,343,226 B2 | 3/2008 | Ehlers et al. |
| 7,349,765 B2 * | 3/2008 | Reaume et al. ............... 700/295 |
| 7,873,441 B2 * | 1/2011 | Synesiou et al. .............. 700/286 |
| 7,894,943 B2 | 2/2011 | Sloup et al. |
| 7,948,113 B2 | 5/2011 | Abe |
| 8,014,905 B2 | 9/2011 | Ehlers |
| 8,121,734 B2 | 2/2012 | Larsen et al. |
| 8,131,403 B2 * | 3/2012 | Forbes et al. ................ 700/295 |
| 8,178,997 B2 | 5/2012 | Talkin et al. |
| 8,214,062 B2 | 7/2012 | Eguchi et al. |
| 8,577,822 B2 * | 11/2013 | Kusiak et al. .................. 706/45 |
| 2002/0019758 A1 | 2/2002 | Scarpelli |
| 2002/0072868 A1 | 6/2002 | Bartone et al. |
| 2003/0151309 A1 | 8/2003 | Hutton |
| 2006/0072262 A1 | 4/2006 | Paik et al. |
| 2006/0155423 A1 | 7/2006 | Budike |
| 2006/0276938 A1 | 12/2006 | Miller |
| 2007/0203860 A1 * | 8/2007 | Golden et al. ................. 705/412 |
| 2008/0165714 A1 * | 7/2008 | Dettinger et al. ............. 370/311 |
| 2008/0172312 A1 | 7/2008 | Synesiou et al. |
| 2009/0240381 A1 * | 9/2009 | Lane ............................. 700/296 |
| 2009/0319090 A1 | 12/2009 | Dillon |
| 2009/0326726 A1 | 12/2009 | Ippolito et al. |
| 2010/0052421 A1 | 3/2010 | Schindler et al. |
| 2010/0145532 A1 | 6/2010 | Gregory et al. |
| 2010/0145534 A1 | 6/2010 | Forbes, Jr. et al. |
| 2010/0222934 A1 * | 9/2010 | Iino et al. ..................... 700/291 |
| 2011/0106321 A1 * | 5/2011 | Cherian et al. ................ 700/286 |
| 2011/0270452 A1 | 11/2011 | Lu et al. |
| 2012/0010757 A1 | 1/2012 | Francino et al. |
| 2012/0010758 A1 | 1/2012 | Francino et al. |
| 2012/0029720 A1 * | 2/2012 | Cherian et al. ................ 700/297 |
| 2012/0029897 A1 | 2/2012 | Cherian et al. |
| 2012/0083930 A1 * | 4/2012 | Ilic et al. ...................... 700/287 |
| 2012/0109400 A1 | 5/2012 | Sundaram et al. |
| 2013/0090777 A1 | 4/2013 | Lu et al. |

FOREIGN PATENT DOCUMENTS

| | | |
|---|---|---|
| JP | 2011 221971 A1 * | 11/2011 |
| WO | WO 85/01851 A1 | 4/1985 |
| WO | WO 2008/118396 | 10/2008 |

OTHER PUBLICATIONS

Notice of Allowance dated Jan. 25, 2013 from U.S. Appl. No. 13/327,411.
Final Office Action dated Nov. 29, 2012 from U.S. Appl. No. 13/327,411.
Office Action dated Jul. 30, 2012 from U.S. Appl. No. 13/327,411.
Office Action dated Dec. 26, 2013 from U.S. Appl. No. 13/779,505.
Invitation to pay Additional Fees and Partial Search Report in PCT/IB2012/002705 dated Apr. 15, 2014.

* cited by examiner

Aggregation of Loads

Reference Curve for Virtual Load

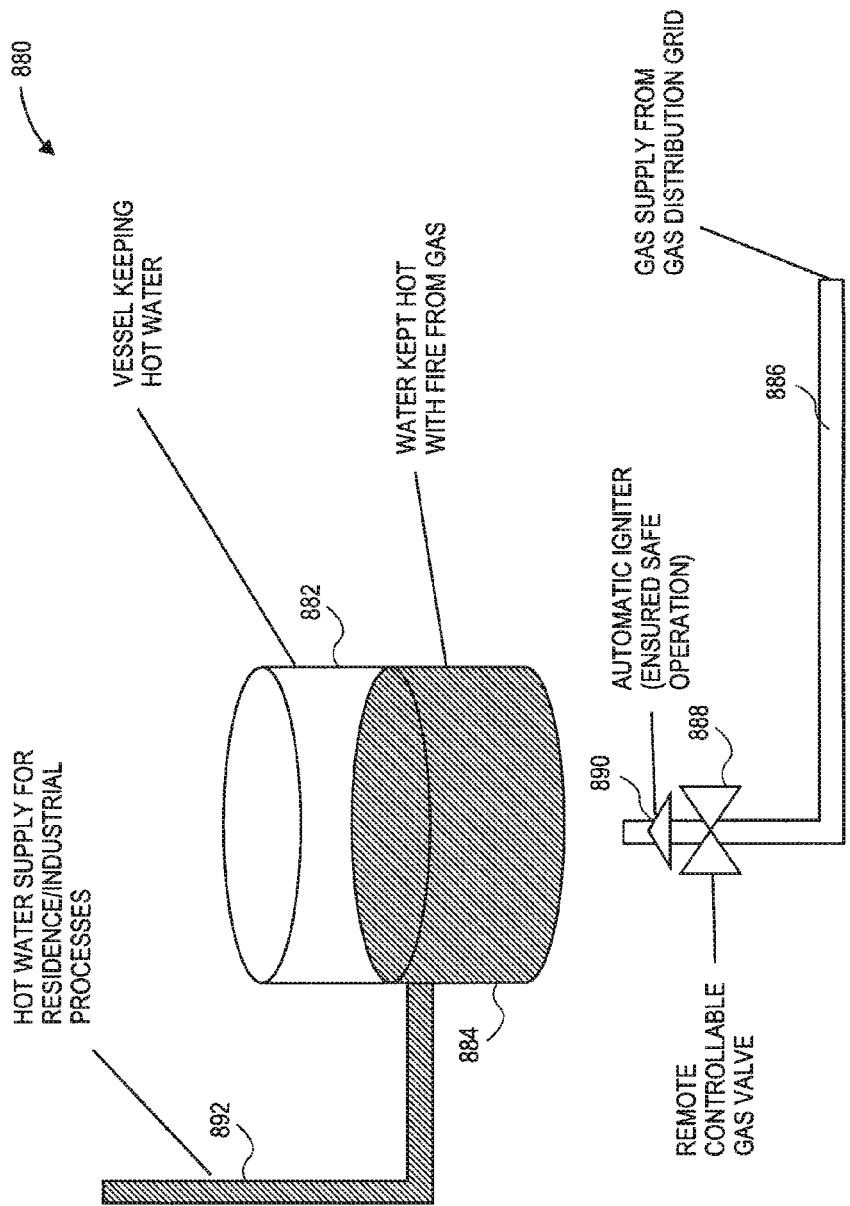

AUTOMATED DEMAND RESPONSE ENERGY MANAGEMENT SYSTEM

FIELD OF THE INVENTION

The present invention relates generally to energy management. More specifically, the present invention relates to techniques and interfaces for optimal tuning of demand for energy, often referred to as automated demand response, to address balancing or energy management needs.

BACKGROUND OF THE INVENTION

Energy management is pursued at many levels today: in the electricity market this ranges from local energy management at industrial sites or residences, to distribution grid and transmission grid energy management; and, in the natural gas market this ranges from local energy efficiency in co-generation plants (combined heat and power production) to the gas transmission system. There is an increased need for techniques to better tune the timing and quantity of energy demand (i) to the needs of the system transmitting and distributing the energy, as well as (ii) to the needs of (instantaneously available) supply. But, the tuning of the energy demand of a load has to be done without negatively affecting the operation of the load or the processes (such as, e.g., industrial processes) relying on the operation of the load.

Regarding electricity, consider the case of a cold store at the local level (a warehouse where consumer goods such as food are stored in a frozen or chilled state). Typically, the automation of the installation is tuned to the needs of the products that are kept in the various cells of the cold store, i.e., the cold store is operated to maximize the duration of storage and minimal deterioration of the quality of the stored goods, but electricity consumption is not optimized in time with respect to electricity prices and demand-supply equilibriums in general, electricity consumption is not optimized with respect to peak power restrictions (typically, electricity consumers are penalized for excessive peaks in their power profiles), and, electricity consumption is not optimized with respect to the machines' energy efficiency (e.g., the coefficient of performance of a compressor decreases the lower the temperature). These issues are applicable to almost any industrial or residential power consumer, albeit with different specific energy efficiency problems at the machine level.

At the transmission grid level and/or at wholesale market level, consider the case of an electricity supplier or transmission system operator who is facing inefficiency problems mostly in the area of supply-demand imbalances. For the transmission system operator (TSO), these imbalances are a threat to the grid's stability—and, by its mandate, stability is a goal that must be achieved by the TSO. For the electricity supplier, unforeseen imbalances between supply and demand are typically penalized by the TSO (and, depending on the market, this could be structured in a day-ahead nomination procedure and/or an intra-day penalty market). Accordingly, not only is there a need for better forecasting in order to generate the right amount of supply, but there is also a need for flexible demand of energy, i.e., loads whose power consumption can be steered and scheduled in a fast and reliable way according to the energy players' needs—to balance out unexpected surpluses or shortages in power.

FIG. 1 illustrates an example of such an imbalance. At 9 a.m. the power production 2 greatly exceeds the demand for power 4, accordingly, an excess of power 6 is produced potentially leading to grid instability or waste. At 9:15 a.m. the demand for power 10 greatly exceeds the power production 8 leading to an excess demand 12. A similar situation is also found at 9:30 a.m. In these situations the excess supply or excess demand can lead to instability, use of inefficient resources to generate more power, and/or a potential brown-out. These supply-demand imbalances indicate that energy players need flexible power control. Similarly, power consumers typically have no flexible power consumption, i.e. such power consumption cannot be tuned to the energy market needs of these energy players.

FIG. 2 illustrates a potential imbalance when a renewable source of energy such as wind is used. At 9 a.m. the combination of wind power production 22 and gas-fired power production 24 far exceeds the demand for power 26. But, at 9:15 a.m., when there is no wind, the gas production 32 is not adequate to meet the demand 34. Accordingly, FIG. 3 illustrates a prior art approach in which the gas plant is turned off and the wind production 22 is more than adequate to meet the demand 26. Of course, penalties must be paid for the residual imbalance. At 9:15 a.m., since there is no wind production, the gas-fired power production 42 is turned up to meet the demand 34 and inefficiencies result because gas-fired power production has higher variable cost and produces additional carbon emissions than relying upon wind power. In addition, relying upon an extra gas-fired production plant running at partial capacity in order to provide flexibility, results in opportunity costs and inefficiency because of heat losses due to ramping up or ramping down the plant, and lower energy efficiency of the generation itself.

At the local distribution grid level, consider an area in the distribution grid (specifically, a "terminal branch") where there is a very high concentration of solar panels as well as a few significant industries. The energy production level will be determined by the amount of sunshine at a given time. The amount of energy demanded by the loads will be dominated by the industrial processes. Without optimization, supply and demand will be out of synchronization at this level. At times, this imbalance will cause a local oversupply of energy in the last branch of the distribution grid, which will be transported up to the higher voltage grid. This transport of energy reduces efficiency of the overall system, specifically via heat losses. Moreover, transforming the energy to a higher voltage induces strain on transformers which typically have not been designed for this. And, at times when there is not sufficient solar production to cover local demand, the energy will need to be supplied from other, farther away, less efficient energy production resources.

The above examples of imbalances have relatively large time scales, i.e., on the order of minutes rather than seconds. Indeed, on the grid level, for example, the natural time scale is typically 15 minutes since the supply-demand equilibrium for energy portfolios is defined on that scale. The same holds for typical industrial loads which again react in terms of minutes. One should note, however, that there is in addition a specific need for power which can be shifted on very short time scales. For instance, for an energy supplier with both power production and demand in its portfolio, one of the challenges is to quickly react to production plants that unexpectedly fail and stop production. This can happen on short notice, and can leave the energy supplier with an imbalance of power (demand side being larger than supply side). Ideally, the supplier would be able to switch off an amount of consumed power equal to that produced by the failing plant on a very short time scale to avoid disruptions.

Another example of the need for fast-response flexible power is given by renewable energy. As energy players have an increasing amount of wind, solar and other renewable power production in their portfolios, they are faced with unpredictable power production. Far an energy supplier, the effect of an unexpected drop in wind is equivalent to a production plant outage. Here too, there is an increased need to be able to compensate on very short notice by scheduling power on the demand side of their portfolio.

There is also a need in the natural gas market for better tuning of demand. In a gas distribution system, for example, there is an increased need of balancing demand with supply. Supply in this market comes typically from shippers, who connect to terminals with storage available, and demand comes from residential and industrial natural gas consumption. While, as opposed to the electricity grid, there is significant storage availability in most gas distributions systems, there is still a need to absorb unexpected excesses of gas demand or supply, as otherwise the pressure in the gas system cannot be maintained at levels acceptable for good operation of the system. In order to provide an incentive to the shippers of natural gas active on its system, the Transmission System Operator (TSO) typically penalizes the suppliers for supply-demand imbalances. Residual imbalances on the system are then the responsibility of the TSO, and the TSO needs to have sufficient tools available—such as storage and flexible demand—to absorb these imbalances. For shippers of natural gas, it is clear that the availability of flexible demand (i.e., a set of gas loads whose demand can be steered) can help them to tune the demand to their actual gas supply, and hence avoid penalties from the TSO.

Therefore, in the overall market of energy players (both electricity and gas) and consumers (residential, commercial and industrial), there is a need for increased energy management. One specific need is for flexible power demand, i.e., control over power of a load which can be scheduled according to a need to distribute excess power or to reduce power.

SUMMARY OF THE INVENTION

To achieve the foregoing, and in accordance with the purpose of the present invention, an energy management system and techniques are disclosed that optimize the tuning of demand for energy, often referred to as automated demand response, to address balancing or energy management needs.

In general, the present invention implements a fully automated demand-response system used by energy players to mitigate the risk of over or underproduction, and to perform day-ahead or intraday energy trades in order to (physically) balance their portfolio or grid. The system optimizes the flexibility of its loads and has relatively low latency. Initially, the technique optimizes the power flexibility of one or more loads; each of these loads is connected to a control system via a communication network allowing not only data acquisition from each load, but also remote control of the load via the load's control parameters. Secondly, all loads (independent of being optimized) are aggregated into one virtual load which itself is also optimized to be flexible in terms of power consumption. This virtual load can then be managed by an energy player; desired increases or decreases in power during a time period are applied to the virtual load. Thirdly, the technique also dispatches and schedules control of each individual load, i.e., the optimal implementation of increase or decrease in power on the virtual load.

There are advantages to a load operator in accepting a reduction in power or in accepting an increase in power in the context of the present invention. If an energy player asks a load operator to accept a reduction in power (while ensuring that the load operates within its constraints), the load operator will typically accept such a reduction because the energy player will offer a financial incentive (this incentive is offered by the energy player because the local reduction in energy consumption helps the player's economic objectives—because of electricity prices in the case of an energy supplier or because of balancing needs in the case of a system operator). Conversely, an increase in power would typically be accepted by the load operator as it allows the operator to purchase power at a reduced rate. Considering the example of a cold store, the compressor could potentially be switched on at many different times during the day, but by agreeing to switch it on when most useful for an energy player, the load operator is buying power when excess power is available. Running the compressor earlier than usual will lower the temperature of the cold store, but still within its temperature range constraints.

Even though the requirement of fast-response scheduling of energy consumption produces specific demands on the loads being used, the present invention is able to address those demands. Batteries (e.g., of laptops) are one example of loads that can be scheduled on very short notice using the present invention, while some industrial loads have longer response times (given ramp-up/down times inherent in the machines involved) that can also be addressed by the present invention. When the virtual load contains loads with both short and long response times, the aggregated system will still have an effective response time that is kept short because the central control system will schedule the loads with short response time first.

In the smart grid context, prior art often looks passively at which control parameters are available for a single load, and then use parameters to steer the power instantaneously. By contrast, the present invention actively chooses an optimal set of control parameters that maximize the power flexibility of the load. And, while certain manual demand-response aggregation techniques exist, the present invention improves upon these by providing a single, large virtual load that can easily and automatically be scheduled and controlled using a power level as its control parameter. In addition, the user interface presents energy flexibility with respect to an already-agreed-upon reference curve which is more familiar to an energy trader.

Controlling the demand for gas has comparable advantages. To maintain the gas pressure in the distribution system, typically an incentive mechanism is put in place. Flexible gas consumption is able to benefit in the same way as electricity consumption does. When there is an oversupply (when pressure is too high), gas can be bought effectively at a reduced price. When there is a shortage, the load owner will be offered financial compensation to reduce gas consumption.

In a first embodiment, the power flexibility of an energy load is maximized. The load is characterized by constraints, control parameters and may be represented by a computer model. Solving a value function that maximizes the energy flexibility of the load over various time intervals yields a subset of control parameters that are best able to control the load within its constraints while maximizing its power flexibility.

In a second embodiment, the power flexibility of a virtual load representing any number of actual loads is maximized. A global value function is maximized that includes a value function for each individual load. The solution yields a dispatch function providing: a percentage of energy to be assigned to each individual load per time interval, a possible time power level within a time interval for each load, and control parameters and values. An economic term of the global value function represents the value of the power flexibility to different types of energy players.

In a third embodiment, a power level for the virtual load is distributed over any number of actual energy loads, in order to dispatch specific energy loads. Each actual load is assigned a percentage of the power level, and an inverse model of the load is used to determine control parameters and values using this percentage of power. The parameters and values are delivered to each load and each load is controlled while following its unique set of constraints.

In a fourth embodiment, a power level for a virtual load in a time interval is distributed over actual energy loads using energy compensation, in order to dispatch specific energy loads. The negative of the power level is distributed for the virtual load over other time intervals other than the interval for which the power level is scheduled. An inverse model for each load is used to schedule the percentage of power for each actual load to produce a set of control parameters and values for each load.

In a fifth embodiment, a user interface displays the power flexibility of a virtual load. An upper bound for a time interval is determined that represents the maximum amount of power than may be reduced by the virtual load. A lower bound for the time interval is determined that represents the maximum amount of power that may be consumed by the virtual load. Each time interval in a given time period may have its upper and lower bounds calculated in the same way.

In a sixth embodiment, a user interface is used to change the energy consumption of a virtual load. A desired power level is received for a particular time interval. Automatically, upper and lower bounds for the other time intervals within the time period are re-calculated and displayed. The desired power level may be distributed amongst any number of actual loads and these actual loads will be dispatched taking the desired power level into account.

In a seventh embodiment, energy may be rescheduled for a virtual load. Power logging data is received from the actual loads within the virtual load and an estimate is made of the total energy consumption within the current time interval. If there is a significant difference between the scheduled energy and the energy being used, then the energy schedule may be recomputed. A new energy schedule may be distributed amongst the actual loads using a new energy value for the current time interval. Additionally, one or more of the load models may be updated with more up-to-date information, and the inverse of each of these load models is used to input a power level for each load and output appropriate control parameters and values to control the load within its constraints.

BRIEF DESCRIPTION OF THE DRAWINGS

The invention, together with further advantages thereof, may best be understood by reference to the following description taken in conjunction with the accompanying drawings in which:

FIG. 25 illustrates an example of a natural gas load that may have its gas demand flexibly managed using techniques of the energy management system discussed above.

DETAILED DESCRIPTION OF THE INVENTION

As mentioned above, the present invention is applicable to energy delivered via a distribution network allowing for continuous distribution. This includes energy delivered via electricity, oil, water, or natural gas. As is known, other types of gas include synthetically created gas such as town gas, and other naturally occurring gases such as biogas. As used herein, the terms natural gas and gas include these different types of gas.

Overview and Advantages

Figure 1:
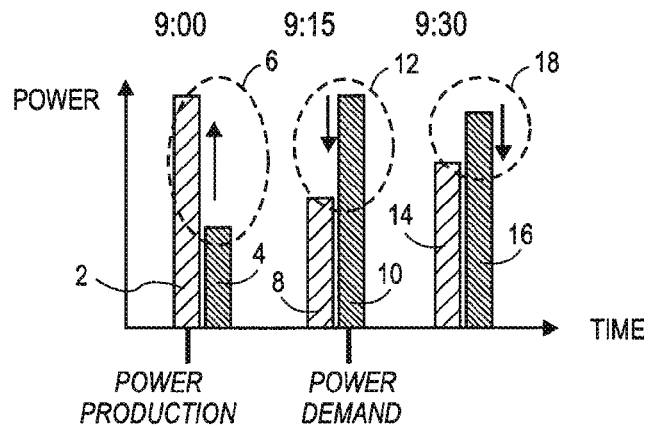
FIG. 1 illustrates an example of a supply-demand imbalance.
Figure 4A:
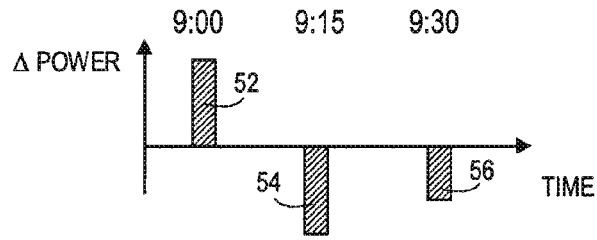
FIGS. 4A-C illustrate how the present invention generally addresses problems with the prior art.
Figure 4B:
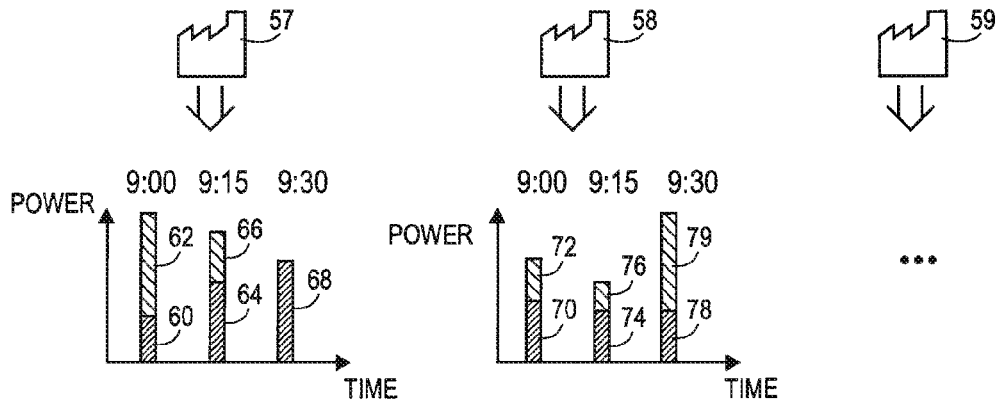
Figure 4C:
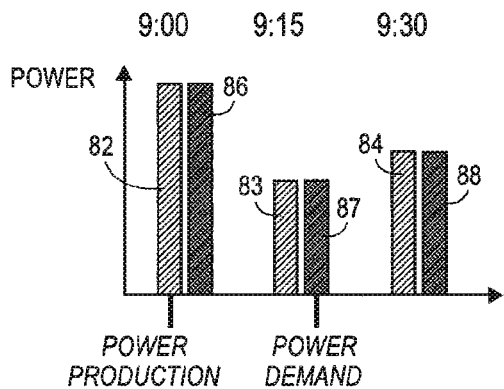

FIGS. 4A-C illustrate how the present invention generally addresses problems with the prior art. FIG. 4A illustrates the scenario of FIG. 1 in which there is an excess of power 52 on the grid at 9 a.m., and shortfalls of power 54 and 56 at 9:15 a.m. and 9:30 a.m. FIG. 4B illustrates how the present invention uses flexible loads to address the problem illustrated in FIG. 4A. Any number of loads 57-59 have been made flexible and have been aggregated into a single virtual load using techniques of the present invention.

Load 57 had forecast power consumption 60, but is able to absorb and use excess power 62 using the present invention. Similarly, load 58 is able to use excess power 72 at 9 a.m. even though it had forecast only a demand for power 70. At 9:15 a.m. load 57 is able to sufficiently meet its needs with a reduced power consumption 64 using the present invention, even though it had forecast a power consumption equal to the combination of 64 and 66. Similarly, load 58 has its power consumption reduced at 9:15 a.m. from a total equal to the combination of 74 and 76 to an actual power consumption of 74. At 9:30 a.m., the power demand 68 of load 57 is met adequately by the power supplied and it is not necessary to reduce its power consumption even though there is a shortfall of power. Load 58 at 9:30 a.m., however, has its power consumption reduced to total power 78 instead of using the forecast total power combination of 78 and 79. Of course, any number of other loads 59 may have their power consumption adjusted throughout the day using the invention. Accordingly, FIG. 4C shows a result of using the present invention in which power production 82-84 throughout the day for these loads is equivalent to the power demand 86-88 in each time interval of that time period. Advantageously, power may be adjusted up or down for each load yet still allow each individual load to operate within its constraints and meet the needs of its operator.

Figure 2:
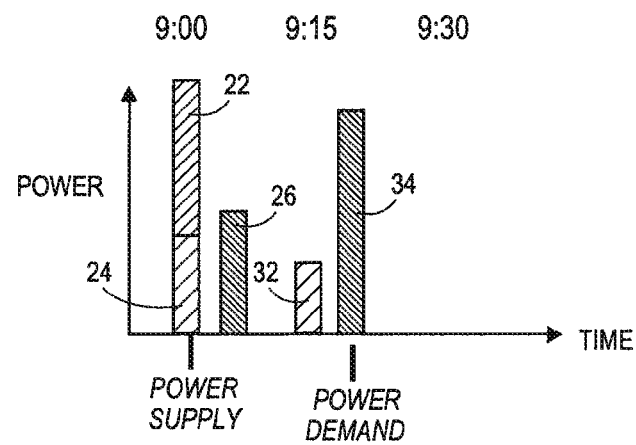
FIG. 2 illustrates a potential imbalance when a renewable source of energy such as wind is used.
Figure 3:
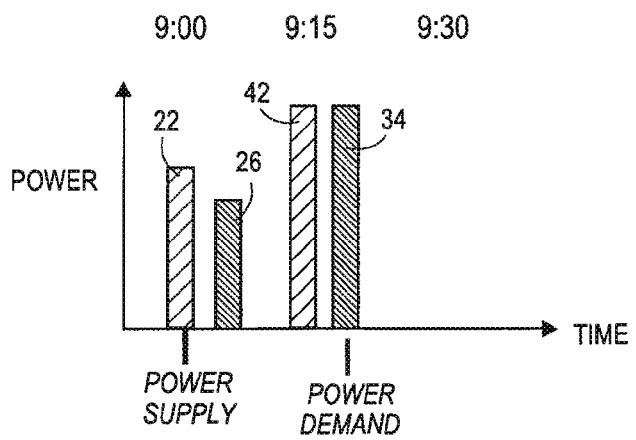
FIG. 3 illustrates a prior art approach in which the gas plant is turned off and the wind production is more than adequate to meet the demand.
Figure 5:
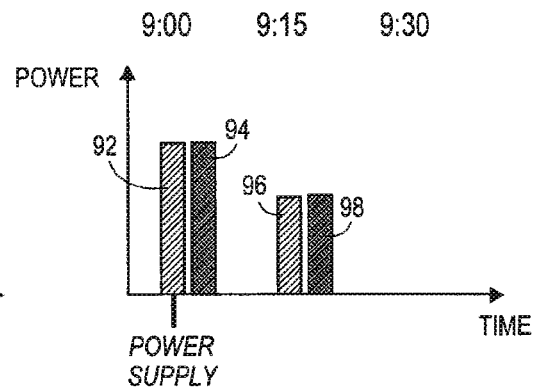
FIG. 5 illustrates use of the present invention when a renewable energy source such as wind is involved.

FIG. 5 illustrates use of the present invention when a renewable energy source such as wind is involved. Improving upon the prior art technique of FIG. 2, at 9 a.m. the demand for power 94 using any number of loads is turned up to meet the increased supply 92 when the wind produces excess power. Conversely, at 9:15 a.m. the demand for power 98 among any number of loads is turned down to meet the reduced supply 96 when less wind power is produced. Advantageously, all of the loads involved are not only able to optimally use more power than forecast (or to use less power than forecast), but also are able to operate within each of their set of constraints when it is necessary for their demand to be reduced or increased.

The present invention can also be applied to natural gas in a similar fashion. Gas consumption is made flexible using the same methods applied to different control parameters and user constraints. Different loads are aggregated into a virtual load and the resulting flexibility is managed in the same way as is done with electricity.

Energy Management System

Figure 6:
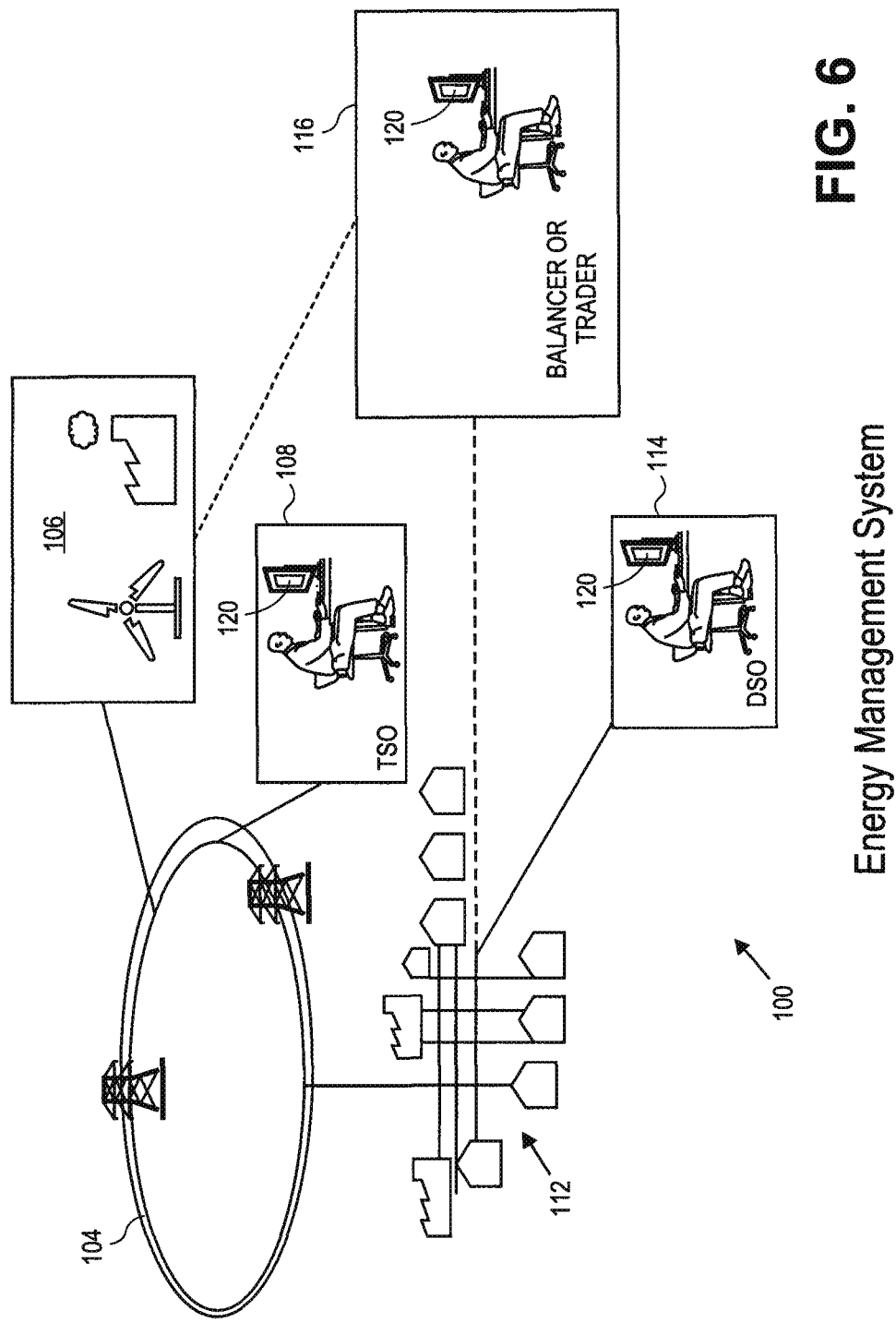
FIG. 6 illustrates an energy management system according to one embodiment of the invention.

FIG. 6 illustrates an energy management system 100 according to one embodiment of the invention. Advantageously, the present invention provides to any of a number of energy players access to aggregated flexible power through innovative systems, methods and user interfaces. Although the present invention will be primarily described with respect to electricity as an energy source, the present invention is also applicable to the use of natural gas as an energy source.

Shown is a typical transmission grid 104 that transmits electricity over long distances. An energy utility 106 produces electricity via means such as coal-fired plants, nuclear plants, oil-fired plants, natural gas plants, etc., and may also use renewable sources such as wind, biomass, solar, hydroelectric, wave or tide generated, etc. Traditionally, a utility company would produce and supply power, although now an energy producer might produce energy but not supply it, while an energy supplier supplies consumers with electricity but might not produce it. Such an energy supplier may or may not have production assets itself, and is typically active as an energy trader, buying and selling power depending upon market conditions and portfolio changes. All of these utilities, producers and suppliers are generally encompassed using reference 106.

The transmission grid is connected to a local distribution grid 112 that supplies the power to residential, business and industrial consumers of electricity. In addition to the utilities and the grids, system operators also have a hand in supplying power. A transmission system operator (TSO) 108 maintains the stability of the high-voltage part of the transmission grid, while a distribution system operator (DSO) 114 maintains stability of the lower voltage distribution grid 112. Another entity is an individual (or function) at an energy supplier termed a balancer 116 who aims to maintain balance in both power supply and demand to avoid inefficiencies and to avoid penalties imposed by the TSO. A similar entity is a trader 116, also at the supplier, who trades power with other energy players. All of these entities which collectively manage power—producers, suppliers, utilities, operators, balancers and traders—are collectively referred to as "energy players."

As will be explained in greater detail below, each of these players has access to an innovative user interface 120 (backed by server computers, innovative methods, communication and control hardware) that allows each energy player not only to visualize the power flexibility of the overall energy management system, but also to exercise remote control in real time over any number of loads as conditions change.

Figure 7:
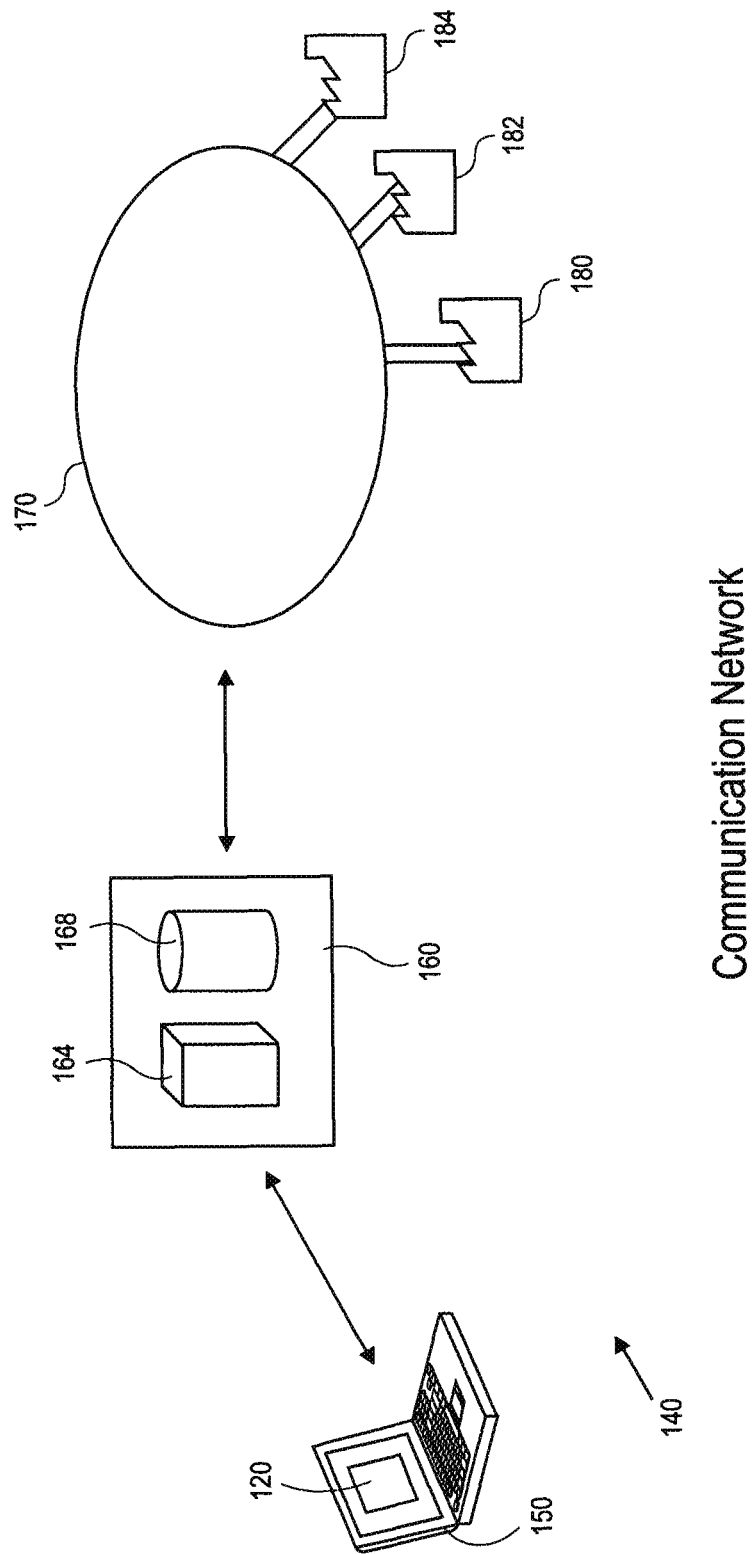
FIG. 7 is a block diagram illustrating one embodiment of a communication network used to implement the energy management system.

FIG. 7 is a block diagram illustrating one embodiment of a communication network 140 used to implement the energy management system 100. Shown is a computer 150 linked over the Internet to a central control system 160 having a user interface 120 referred to in FIG. 6. The computer is any suitable computer (such as a laptop or desktop computer) used by an energy player to access a Web application running on control system 160. The energy player uses the Web application to manage energy (e.g. balancing supply and demand) and to make trades as will be discussed below. When implemented as a Web application, no extra software need be installed on computer 150, although, it is possible to implement the software described in control system 160 also upon computer 150 (or upon any number of computers).

Control system 160 includes computer servers 164 and a database 168, and is preferably cloud-based, although other schemes are contemplated such as servers in a co-located data center, dedicated server infrastructure or personal computers. In one embodiment, an interface computer server (or servers): manages the network 140 and provides an interface to computers 150 and to loads 180-184; communicates with the loads; collects all business data (network data, client data and specifications of loads and users); collects state logging data used for pattern recognition, forecasting and other parameter fitting; and generally provides a front end to the control system. The data may be stored within database (or databases) 168. An algorithm computer server (or servers) executes the algorithms and techniques described herein and is in communication with the interface server. The Web application executes upon the interface server.

The control system 160 has a secure connection to a communication network 170 with which it communicates with all of the various loads managed by the energy management system. In one embodiment, the servers at these locations are securely connected via IPSec VPNs to a private wireless network and private VPN using fiber cable, which allows coupling of local control systems and loads that have connectivity over Internet, using wireless or directly connected to the private fibre cable network. At the sites of factories or businesses that offer flexibility of their loads, a buffer is installed to manage data transfer between the servers (164) and the local control systems of the loads.

Examples of Loads

Figure 8:
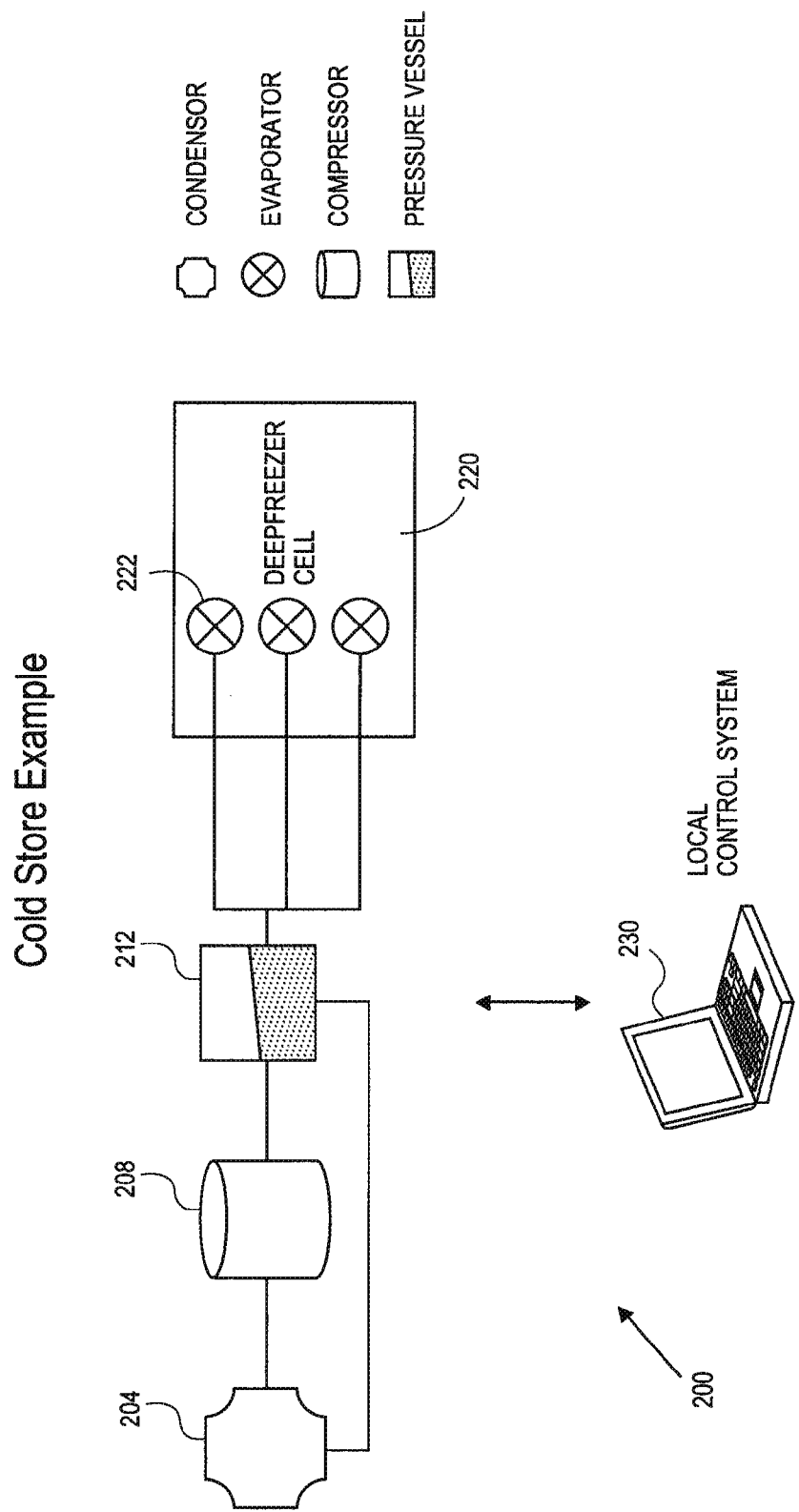
FIG. 8 is a block diagram of a cold store which will be used as an example of an electrical load used with the present invention.

FIG. 8 is a block diagram of a cold store 200 which will be used as an example of an electrical load used with the present invention. Of course, the present invention is applicable to any type of energy load having control parameters that can be controlled electronically and is not limited to the examples presented herein. The cold store includes a condenser 204, a compressor 208, a pressure vessel 212, and any number of evaporators 222 present within an individual deep freezer cell 220. More than one cell may be present within a given cold store, and a cold store may have different configurations or components. As is known in the field, a cold store uses electricity to keep frozen or chilled a variety of products and need not necessarily run its compressor at full power constantly. The cold store has constraints upon its operation (such as a maximum temperature) and has various control parameters that control its operation; as such, it is one example of an electrical load that can benefit from the techniques of the present invention. In one embodiment, control system 160 communicates with the cold store 200 (e.g., delivering control parameters and values to implement an energy schedule) via a local control system using a computer 230, for example.

Other examples of electric loads that may benefit from use of the present invention are laptops, industrial ovens and other thermal loads, computers, data centers, pumped-storage hydroelectric plants, industrial electrolysis, agriculture equipment, HVAC, material handling equipment, oil and gas pumping systems, breweries and other manufacturing sites. In general, an electric load is suitable for use with the present invention as long as the load is connected to the electricity grid, and it either has a control system attached to it, or it can be connected to a control system. In general, a gas load is suitable for use with the present invention as long as the load is connected to the gas grid, and it either has a local control system attached to it, or it can be connected to a local control system.

Maximizing the Flexibility of a Load

Figure 9:
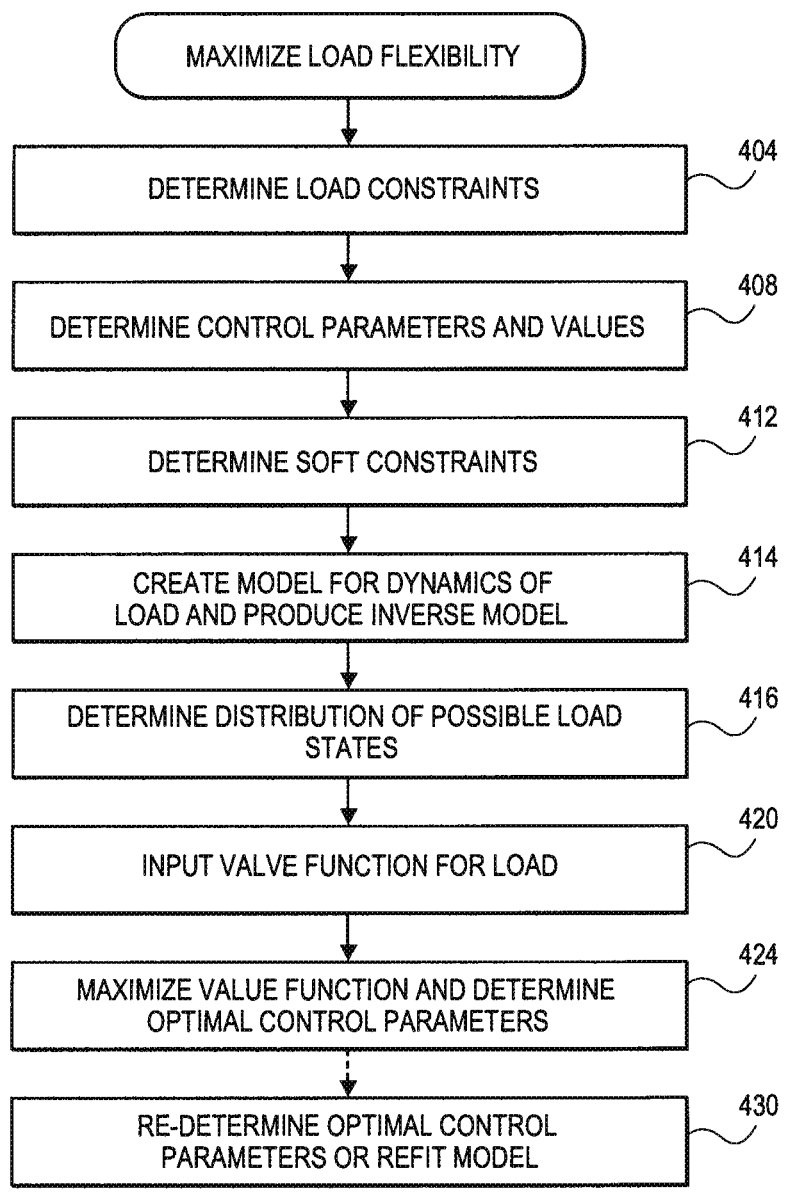
FIG. 9 is a flow diagram describing one embodiment by which the power flexibility of a particular load is maximized.

FIG. 9 is a flow diagram describing one embodiment by which the power flexibility of a particular load is maximized. This method describes how the energy use of a particular load to be scheduled over a future time period (such as the next day) can be made maximally flexible and thereafter presented to an energy player desiring to have flexibility to schedule power during that time period. Advantageously, any changes in scheduled power will still allow the load to operate within its constraints.

In step 404 the load constraints for the particular load in question are determined; these constraints include both manufacturer load constraints as well as user load constraints. Manufacturer constraints include operating constraints and hardware constraints imposed upon those physical elements of the load that would typically cause the load to fail or not to function if the manufacturer constraints are not satisfied. For example, a cold store has a maximum external voltage/current/power that must not be exceeded, a compressor capacity, and a constraint that the compressor should not be switched on and off too often. These manufacturer constraints may be determined by an analysis of the particular load in question, its historical performance and user and installation documents associated with the load. User constraints include those constraints typically imposed by the operator of the load and that may be unique to the load or to its current purpose, such as boundary conditions. For example, a cold store operator will impose a temperature range on certain types of goods kept within the cold store, and may have a constraint related to an expected supply of new goods.

For a laptop connected to the grid, with a local control system that can disconnect the laptop from the grid when plugged in (and then run further on the battery), the user constraints are, for example, that the user wants equal performance from the laptop during disconnects, implying that the disconnect cannot be longer than is allowed by the state-of-charge of the battery at the disconnect time.

In step 408 control parameters of the load and their possible values are determined. Control parameters include any aspect of the load that may be controlled, and typically depend upon the control system used by the load. Changing the control parameters (or rather, their values) will typically affect operation of the load, may change its functionality for better or for worse (depending upon the purpose of the load), and may change the power used by the load. For a cold store, its control parameters include the valve position of each evaporator (whether or not its valves are open or closed), the capacity level of the compressor (at which percentage of its maximal capacity it is operating), a minimum or maximum (cell) temperature, the evaporator fan speed, etc. The resulting set of control parameters includes any possible subset of the control parameters and their values.

In step 412 any soft constraints for the load are determined. Soft constraints are typically those constraints that while they need not necessarily be obeyed, they should be followed for particular reasons, usually because of an economic impact on the load. In the example of the cold store, soft constraints include limits on the impact of the expected lifetime of a component such as the compressor, limits on the impact of expected wear on a particular component, and limits on the coefficient of performance of the compressor (which decreases at lower temperatures). For example, switching the compressor from rest to any power level decreases its lifetime. Hence, a possible soft constraint could be a limit on the number of times the compressor can be switched off per day. These soft constraints are introduced into the value function described below through the use of penalty terms which penalize the value function when certain control parameters are used that affect these soft constraints. Examples of soft constraints for a laptop include the impact on the battery lifetime of switching the laptop on and off frequently, the value that the user assigns to having a full battery when disconnecting his laptop, etc.

In step 414 a model for the load is created and the inverse model is also produced. The model provides the mathematical description of the loads system dynamics and is implemented through a computer program. In this case, the implemented model mimics the dynamics of the load, in this example, a cold store. The model takes into account all of the constraints placed upon the load and uses as inputs the control parameters and their possible values. The model helps answer the basic question, "when a control parameter value is changed, how does that affect the power used by the load?" For example, if the valves in the evaporators are closed within the cell, how does that change affect the power demands of the cold store? Models may be created in various ways as known to those of skill in the art. One technique is to rely upon historical data of the load and develop a "black box" that takes the control parameters as input and produces the power required as output (using, for example, self learning such as neural network techniques). Such a black box model can typically be used for different types of loads. Another technique that may be used is to look at the basic physics of the load, i.e., first principles, and develop formulas using differential equations (for example) that may be solved to produce the model's output. Typically, such a model needs to be calibrated based upon observed, real-world data in order to ensure its accuracy. Such a model that is built from first principles is very load dependent. Typically, the computer model is created manually. The implementation is in software and the parameter fitting of the model is such that it can be run automatically.

Once created, the model is designed to take into account all load constraints, the current state of the load, and to accept as input any control parameters and their values. In general, the output of the model describes how the state of the system changes over time and its power requirements at particular time intervals. In the case of a cold store, the outputs may be the resulting temperature of the cold store and the amount of power needed during that time interval. In practical usage, the output is simply the changes in power needed to go from state to state. For example, if a cold store is operating in a temperature range of −10 to −15 and it is desired to lower the temperature to −17, the model will tell one how much power is required to lower the temperature. Accordingly, when maximizing the value function as described below the model will be used to provide the minimum and maximum energy levels (and thus the change in energy) required in a given time interval. Strictly speaking, the model will typically be used in the computation of each term of the value function.

An inverse model is also produced based upon the load model and those of skill will understand how an inverse model is produced. Basically, when a particular energy level is supplied to a load the inverse model will output which control parameters will have which values not only to utilize the energy level but also to continue to satisfy the constraints of the load. Unless mentioned explicitly, we will use energy level and power level interchangeably, under the assumption of constant power level on a given time unit. It is clear that the equivalence of power and energy is ensured on any infinitesimal time interval. Hence, the inverse model can also be used to map any power level to control elements. Preferably, energy levels over time intervals of an entire time period are supplied to the load, for example, a period of a day. The inverse model may be created from the load model in a variety of manners. The most straightforward way is to use root solving to generate a set of control parameters that will yield the required energy consumption level given the current constraints. When the model is sufficiently simple, a second possibility would be to express the inverse model in closed analytical form.

When the inverse model is used by the central control system to schedule power, a particular energy level at a particular time interval will be mapped to control parameters and particular values by the inverse model. The domain of the inverse model may be restricted to use only those optimal control parameters (described below) rather than any of the available control parameters. Note also that use of the inverse model does not yield one unique result since in general a given energy level can be consumed using a variety of control parameter schedules. It is noted that the global part of the value function (i.e., the economic term, global constraints, etc.) introduces interaction between the loads. This interaction removes the non-uniqueness.

In step 416 the distribution of possible load states is determined. The load state of a particular load indicates the particular condition or conditions in which the load is typically operated. In the example in the cold store, its state may be indicated by its internal temperature. Or, its state may be indicated by a combination of conditions such as its internal temperature, the external temperature, and the state of any of its components. Of course, states other than internal temperature may also be used for a cold store such as liquid levels in the pressure vessels, evaporator valve position, power consumption of the compressor, external temperature, temperature in the evaporator, etc. The distribution of load states may be determined historically, for example, by looking at the states of the load for the previous year. Historical values will produce a histogram which indicates the distribution of possible load states. In the absence of historical data, load state distributions can be created a priori by imposing a distribution on the domain of allowed load states.

For a laptop, the load state may include the battery state-of-charge, the amount of CPU time used and the estimated remaining run time of one or more finite processes (such as backup, installation, etc.) running on the laptop. In the case where the load is a large building with a building management system to control its energy consumption, the load state may include internal temperatures per room, external temperature, state of the lighting, air conditioning fan speed, air conditioning temperature set point, date and time, etc.

In step 420 the value function to be used for the particular load is obtained. In general, a different value function may be used for each type of load although it may have a similar functional form. The purpose of the value function in the current method is to distinguish between so-called good and bad control parameters in terms of maximizing the power flexibility of the load, and to produce a set of optimal control parameters that will be used to steer the load when power is scheduled. In this step a value function that has been built for a particular load is input. A specific example of a value function that might be used with a cold store load is below.

$$V = E[\Sigma_i \Delta E_i / E_{peak} - \rho]$$

$$= \int P(x) dx [\Sigma_{i=1}^{K} \Delta E_i(x) / E_{peak} - \rho(x)]$$

where
  E is the expectation operator indicating the averaging using the distribution of load states introduced earlier;
  $\Delta E_i = \Delta E_i(x) = \sup_{\theta_a} E_i(x, \theta_a) - \inf_{\theta_a} E_i(x, \theta_a)$ is the difference between the maximal and minimal allowed energy consumption of the load given a load state during the i-th time interval. An explicit reference to time is made here as the allowed energy might depend on time dependent constraints;
  $\theta_a$ denotes the allowed values of the control parameters;
  x denotes a possible state of the load/environment, x element of L, with L={x|x element of L}=the set of all possible load states;
  P(x) is the statistical probability distribution of load states (found, e.g., by using a histogram of load states from historical data);
  $E_{peak}$ is the maximal energy consumption by the system in the given time interval; and
  ρ as introduced in the generic functional form summarizes the economic impact of controlling the load.

A simple example of the term ρ takes into account impact of controlled steering on lifetime of the load and the energy efficiency of the load:

$$\rho = w_1 * \Delta t_{wear} / t_{lifetime} + w_2 * \eta / \eta_{max}$$

where
- $t_{lifetime}$ is the expected lifetime of a resource (e.g., for a load, the manufacturer expected lifetime);
- $\Delta t_{wear}$ is the impact on ($t_{lifetime}$) by selecting specific control parameters given the current state of the system;
- $\eta$ is the energy efficiency of the load given the load state and the choice of a specific control action;
- $\eta_{max}$ is the maximal efficiency of the load given that load state; and
- $w_i$ are weights assigned to the "penalizing terms."

The expectation value is taken over the distribution of allowed load states in order to average the function since typically the behavior of the load depends upon its state (e.g., sampling over all possible temperatures of the cold store). For average temperatures there will be more power flexibility (i.e., the power could be changed while still following internal temperature constraints) compared to temperatures at the boundaries of the internal temperature band where the change in power allowed will be zero. In other words, if the cold store is at its maximum internal temperature, it may not be allowable to reduce any power to the cold store.

The time scale referred to in the value function is the time associated with a load cycle, a cycle of time natural to the load useful for determining the value function. A load cycle is defined as the typical planning horizon on which a load operator works. This planning horizon is important as it is used in user constraints (e.g., "lower the temperature in the cold store before arrival of new goods scheduled tomorrow at 7 a.m."). This time scale is typically divided into several time intervals that reflect the timing in which the energy market works (e.g., intervals of 15 minutes). The value function as described above therefore contains a sum over all intervals comprising the full time scale since the value function is defined over the full load cycle. For example, the natural load cycle of a cold store may very well be a single day which incorporates the heat of day with the cold of night. In the example of charging a laptop, the natural load cycle may be a single charging session lasting approximately 8 hours in which the battery is charged from a drained state to a full state (note that the laptop battery may not be charging the entire duration of the charging session).

In general, the value function maximizes the energy interval $\Delta E$ (maximum energy allowed within constraints minus minimum energy allowed within constraints) attainable in a particular time interval by the load thereby balancing potential costs incurred by controlling the load. The output of the maximization of the value function is therefore the optimal control parameters that may be used to steer the load (within its constraints) when an energy player requests that the load use more power or use less power. In other words, by maximizing the energy interval, the value function produces optimal control parameters that give the energy player the widest range of flexibility in providing less power or more power to the load taking into account all constraints and economic costs.

As shown, the value function is augmented by negative penalty terms indicating those soft constraints (usually indicating an economic impact) previously determined. For example, utilizing a set of control parameters that produce a significant wear on the compressor of a cold store will introduce a larger penalty in the value function and make it less likely that that set of control parameters will be chosen as the optimal set. Preferably, all terms of the value function include denominators to make them dimensionless and are scaled using weight factors.

In step 424 the value function is maximized in order to determine the set of optimal control parameters. In other words, the value function is solved for producing the optimal set of control parameters (absent their values) needed to control the load with maximized optimal power flexibility. For example, the optimal set of control parameters for a cold store may be determined to be the evaporator valve positions and a temperature band in between which the evaporator valves are allowed to change position freely. For a laptop, the optimal control parameter may be to interrupt the power supply and switch to using the battery.

Simple value functions (i.e., those with fewer terms and a limited number of state variables) may be solved for using standard numerical minimization techniques such as the Simplex algorithm or the Newton-Raphson method. More complex value functions (i.e., those with more terms or many control parameters) can be solved for using a constrained Markov chain Monte Carlo technique. For these complex value functions, in determining a control strategy, the value function may be augmented by a regularization term (which penalizes large control parameters) in order to make the problem convex. To determine the strength of the regularization term, one may use Morozov's method. To compute each term in the value function, the load model previously obtained for the load is used. Intuitively, it may be understood that maximizing the value function means iterating through all combinations of parameters, and determining the effect of certain combinations on the value function. For example, how does turning the fans on or off in a cold store effect the temperature and the amount of power needed? Eventually, one may choose the set of parameters that provide the maximum value for the value function and this will be the optimal set of control parameters.

In addition, because of the specific dimensionless form of the value function, its maximum is a numerical value indicating in a universal way the degree to which a particular load is able to maximize power flexibility. If value functions are created and maximized for any number of loads, the load producing the highest value will be the load that is best at handling changes in power, and perhaps the best at maximizing value from an energy player's standpoint. This particular load can be identified, and loads may be ordered by decreasing values for later use in scheduling power.

In step 430 it may be necessary at some point in time to either re-determine the optimal control parameters or to refit the model. If it becomes apparent that the load is not following the model or that the value function is not being optimized (because of changes in the dynamics of the load), it may be necessary to determine again the optimal control parameters as described above. Or, changes in the dynamics of the load may dictate that the model be refit. Refitting may occur using, for example, a local optimization procedure starting from the previous solution.

Schedule Power for a Load

Figure 10:
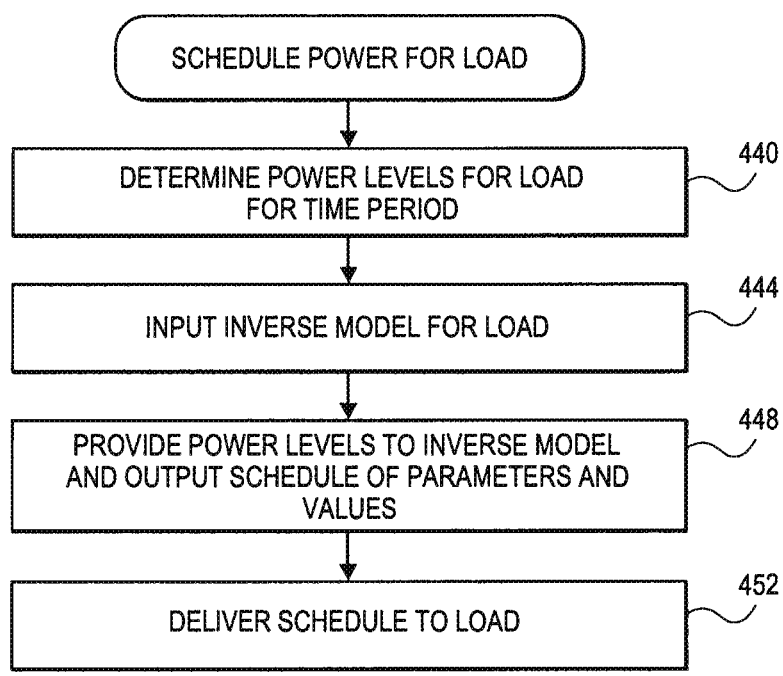
FIG. 10 is a flow diagram describing one embodiment by which power is scheduled for an individual load.

FIG. 10 is a flow diagram describing one embodiment by which power is scheduled for an individual load. Even though individual loads will typically be aggregated into a single, larger virtual load as described below, eventually it will be necessary to schedule power for each load and ensure that the load still operates within its constraints. In step 440 power levels for all time intervals in a given time period (i.e., an energy schedule) are determined for a particular load. These power levels may be determined in the context of an energy trade discussed in more detail below.

In step 444 the inverse model for the load is input. As described above, the inverse model has been produced in step 414, and, while the load model produces a resulting power for the load given a set of input parameters and values, the inverse model produces required parameters and values for a given interval when power is input. The inverse model may be restricted to only output those optimal control parameters (and their values) instead of outputting other control parameters that are not optimal. The inverse model has been designed to output values for the optimal control parameters for each time interval over the time period in order to realize the energy schedule embodied by the power levels of step 440.

While the inverse model will output the appropriate control parameters and their values for particular time intervals during a time period, there may be situations in which the value of a control parameter will change during a time interval. The inverse model is also able to accommodate this situation. Since the model itself describes the dynamics of the load given the control parameter schedule, inverting this relationship (i.e., creating the inverse model) will generate a possibly time-varying control schedule to attain a given energy consumption. For example, if the battery of an electric vehicle only needs 5 minutes of charge in a given time interval in order to become completely charged, the inverse model will take that into account and will output control parameters and values that will result in the battery only being charged the first 5 minutes of the time interval, and after that charging will end.

In step 448 these power levels are provided to the inverse model which then outputs a control schedule of parameters (preferably the optimal parameters) and their values. This output control schedule indicates for each time interval in the time period, which control parameters should be used and what the values should be. In step 452 this control schedule is delivered from the central control system 160 to the load using any suitable communication network and the schedule is then executed by the load using any suitable control hardware, an implementation of which is described below.

To illustrate an implementation of the above techniques, consider an example of the cold store 200 of FIG. 8 which has three cells attached to a single compressor 208. The available control parameters are: compressor power (having values of 0, 50 and 100%); cell evaporator valve position (open or closed); fan speed on evaporators (continuous or bound within a certain interval); temperature set point of each cell; and a temperature band giving minimum and maximum temperature of the cells.

Using the value function defined above, for example, it can be seen intuitively that using the compressor power as a control parameter for steering the power usage of the cold store significantly affects machine deterioration. For example, steering the compressor between zero power and a higher power level contributes to its deterioration, and running the compressor below 100% leads to less energy efficiency. This negative impact on the lifetime of the compressor makes the corresponding term in the value function (regarding the lifetime and wear on the compressor) too dominant and the value function will settle upon a different solution that does not involve using the compressor as an optimal control parameter.

Using the temperature set point of the cells as a control parameter also implies that the compressor will have to switch on and off frequently, again implying a deterioration of the compressor. Moreover, it is also evident that using a set point as a control parameter leads to significantly less flexibility especially for multiple cells. First of all, since the temperature can only deviate a small amount from the set point, this reduces the flexibility for a single cell. Moreover, since the set point cannot control any synchronization between cells, the aggregated power consumption is smoothed out. Another reason why a solution to the value function will disregard this control parameter is that in the case of multiple cells, quite often not all cells will need cooling, again implying that the compressor will have to run below 100%.

Therefore, the value function will disregard the compressor and the temperature set point as possible optimal control parameters and will select different ones. In this case, a solution to the value function will provide as optimal control parameters the evaporator valve position and the temperature band. These optimal control parameters are able to control the power output of the compressor in such a way that it can run on maximal power (and optimal efficiency) and be switched off as seldom as possible. Accordingly, solving for a value function, such as the value function described in step 420, yields optimal control parameters allowing the power of the load to be steered in either direction while also maximizing the efficiency of the load and maintaining it components. Once these optimal control parameters are determined, when power is then scheduled and provided to the inverse model in step 448 the output will be the control schedule mentioned above that uses the optimal control parameters. Thus, the load may be steered to either reduce its power or use more power within its constraints.

Even though an individual load may be made flexible, energy players seeking flexible power typically are not interested in the details and the flexibility of individual, small loads. The number of constraints forms a complexity that is unwanted, and moreover, dealing with individual loads is simply not economical for a major energy player. This realization motivates the aggregation of a large set of individual loads into one new, virtual load, which has boundary conditions that are easy to understand and which can be steered using simple control parameters as if it were one large load. Accordingly, a technique is described that allows any number of individual loads to be aggregated into a single, new virtual load with flexibility that may be easily controlled by an energy player. Preferably, the virtual load has a single control parameter, its power level.

Aggregation of Individual Loads

Figure 11:
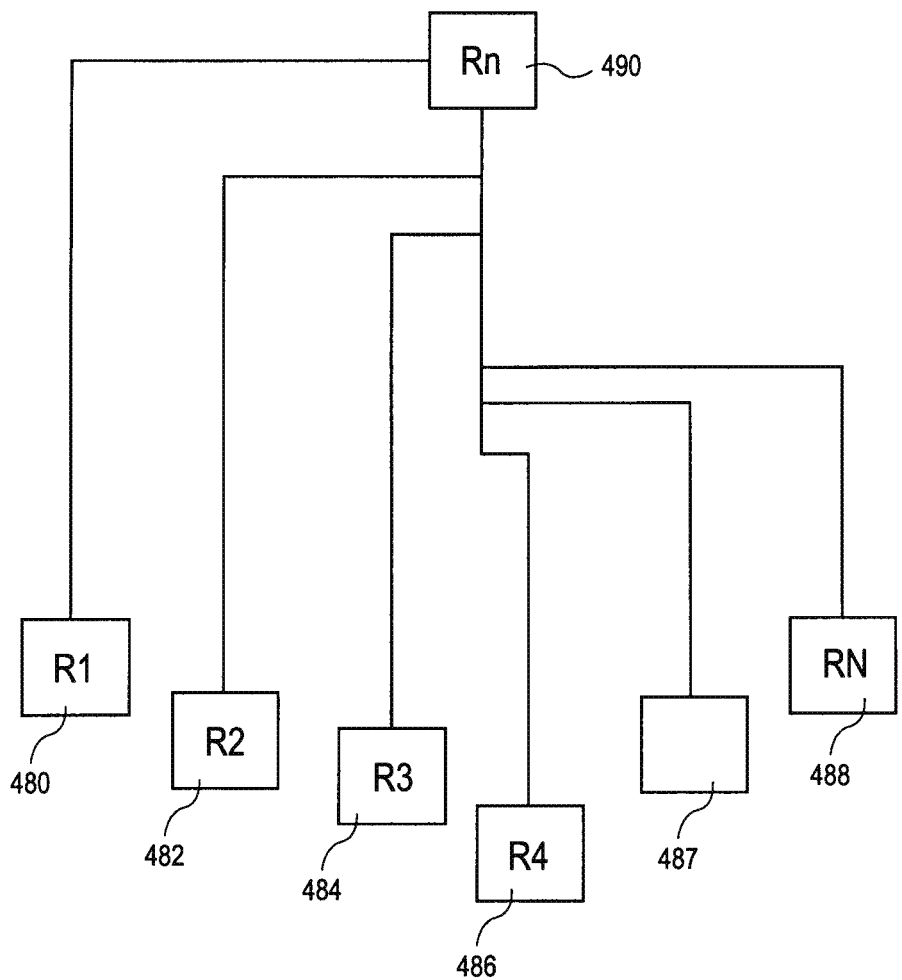
FIG. 11 illustrates how many resources (R), or loads, may be aggregated into a single virtual load.

FIG. 11 illustrates how many resources (R), or loads, may be aggregated into a single virtual load. Shown are individual loads 480-488 each having their own constraints, control parameters, value functions and specific needs for power. Using a global value function, these loads may be aggregated into a single virtual resource, or virtual load 490, with power consumption as a single control parameter. Advantageously, the energy player need only concern itself with steering the power requirements of the virtual load (for which flexibility is provided) which are then mapped down to control schedules (including control parameters and their values) for each of the individual loads. Of course, many virtual loads may be created, each an aggregation of a distinct set of individual loads. For example, loads 480 and 486 may be aggregated to form a first virtual load, loads 482, 484 and 487 may be aggregated to form a second virtual load, and load 488 may exist on its own or may be aggregated with other loads to form a third virtual load.

Figure 12:
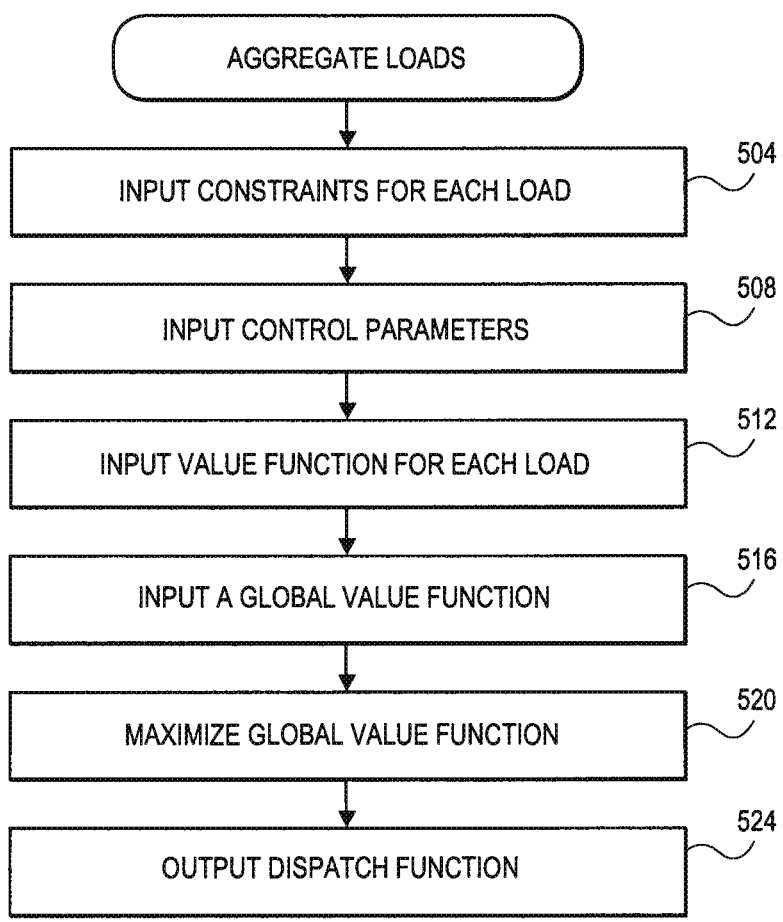
FIG. 12 is a flow diagram describing how loads are aggregated into a virtual load.

FIG. 12 is a flow diagram describing how loads are aggregated into a virtual load. Once any number of loads have been aggregated, the combined load may be seen as a virtual load and power may then be scheduled for this virtual load as if it were a single, real load.

The constraints and control parameters for any number of loads may be input in a variety of manners. In one embodiment, steps 404-424 may be executed for each individual load thus yielding not only the constraints for each load, the model and inverse model, but also the set of optimal control parameters for each load. In this fashion, the aggregation of all the loads includes the set of optimal control parameters for each load and will result in an optimal solution. It may be the case, however, that some or all of the optimal control parameters are not available for use with a particular load. However, in that case we can still execute steps 404-424 now with the additional constraints on the unavailability of some control parameters. The method will then yield other control parameters that are again optimal given the enlarged set of constraints and those parameters will then be used in the current aggregation step. For example, a particular cold store may not allow a group of evaporator valves to be controlled, even though the evaporator valves would normally be considered an optimal control parameter.

Accordingly, FIG. 12 presents one possible embodiment for aggregating the loads. In step 504 the constraints for each load (manufacturer, user and soft) are input or otherwise retrieved from a local database. In step 508 the set of control parameters available for each load are input (some sets which may be all optimal control parameters and some sets possibly including a mix of optimal and non-optimal control parameters).

In step 512 the value function for each load is input, each value function possibly being different from the other value functions. Or, in the case of similar loads, the value functions may have a similar form but may include different terms that are load dependent. Along with the value function for each load is also input the load model and inverse model for each load that has been determined in step 414. As discussed, every load has a set of parameters to control its behaviour. The value function domain is restricted to those. In case we have the freedom to choose the parameters, we will use the previous method to determine the optimal ones and restrict the value function domain to those during the current procedure.

In step 516 a global value function is input. One example of the global value function is the formula shown below and includes a summation of each individual value function from each load as well as an economic term "$\zeta$" known as zeta.

$$V = \Sigma_i v_i + \zeta$$

The first term represents the impact of each load. Note that the expectancy is not taken over all possible initial load states, since the global value function is used for scheduling aggregated loads. The economic term may take various forms, depending upon the end-user of the flexibility such as an energy supplier or a system operator. Accordingly, the economic term places an economic value on the aggregated flexibility according to the viewpoint of the user.

Different users will put a certain economic value on the flexibility of the virtual load. For an energy supplier, or day-ahead balancer, the economic value is driven mostly by the timing of flexibility that coincides with power peaks during the day. For example, the flexibility of power during a demand peak has more value to a supplier than flexible power during base moments because electricity prices are higher at the peaks. The energy supplier is also concerned with being able to meet demand during these energy peaks. For a system operator, though, the economic value is driven mostly by the ongoing availability of flexibility. In other words, the system operator would like to have flexibility (i.e., power capacity) at all times throughout the day, rather than the ability to meet power needs at certain peaks. The system operator desires this capacity in order to maintain grid stability. For a system operator the economic value may also be driven by the response time of the virtual load, i.e., the minimal delay needed to schedule the virtual load. Hence, in this case the economic term will be a decreasing function with respect to the response time. For the distribution system operator, though, economic value will be driven by the distance to the imbalance, as measured along the grid. An intra-day balancer would value flexible consumption higher when its response time is low. Hence, in such a case the value function would indicate decreasing value of flexibility as a function of response time.

An intermediary, such as a demand-response aggregator, using a central control system 160 seeking to offer a flexible virtual load to various energy players may choose an economic term that maximizes the revenue for the intermediary and may use an economic term such as the one shown below, $$\zeta = E[\max(\zeta_1, \zeta_2, \ldots, \zeta_N)];$$

$$\zeta = \int P(x) dx \max(\zeta_1(x_1), \zeta_2(x_2), \ldots, \zeta_N(x_N))]$$

where

E is the expectation operator calculating the expectation of the argument over the distribution of the respective arguments $x_i$; and each $\zeta_i(x_i)$ is the economic value seen by a given energy player, and the dependency is on the drivers of this economic value.

For example, for an energy supplier, $x_i$ may be a pair of (i) the imbalance in his portfolio and (ii) the price of electricity, and $\zeta_i(x_i)$ will be the economic value of flexibility given that price of electricity and sign/quantity of supplier portfolio imbalance. For a system operator, $x_i$ may be the response time of the energy management system and $\zeta_i(x_i)$ may be the economic value of flexibility given that response time and the sign or quantity of current grid imbalance.

In other words, the economic term chosen by the central control system, while not maximizing the value for a particular energy player, maximizes the value to the intermediary in supplying the service. In this example, the demand-response aggregator would prefer to sell the power flexibility to the energy player with the highest bid. Therefore, a global value function may be different for different users of the power flexibility, and the optimization of those value functions will yield different solutions.

In one particular implementation, the second term $\zeta$ (representing the economic value of the scheduled flexibility) has a positive part (indicating the value paid for a requested energy schedule $E_s$) and a negative part (indicating the penalty paid for mis-scheduling the energy—i.e., the energy consumption that is realized $E_r$ might not be exactly equal to the requested energy $E_s$). In the specific example below, however, we focus only on the positive contribution and assume the penalty term is always of the form "$-w*(E_r-E_s)^2/E_{peak}$" where w is a weighting factor and $E_{peak}$ is the maximal energy consumption of the virtual load. Because of the flexibility term per load ($\Delta E_i/E_{peak,i}$), efficient control parameters are favored. Also, the global value function tries to fit the requested energy schedule $E_s$ due to the penalty term in $\zeta$. And, the cost of scheduling, captured by the $\rho_i$ terms (e.g., impact on lifetime) present in the single load value functions $v_i$, are balanced with the economical value of flexibility modelled by the positive part of $\zeta$.

In one specific example, consider an energy supplier focused on day-ahead trading of power. The supplier will associate a certain marginal cost to the production of power. Base power demand (consumed during periods of low demand, e.g., at night) will typically be supplied by "low cost" power plants such as nuclear plants, while peak power demand (consumed during periods of high demand, e.g., the morning and evening peak in electricity prices) will typically be supplied by "high cost" power plants such as gas turbines. This will create a profile of the cost of power production (indicated by $\zeta$ here) during the day, dependent on the marginal cost for the supplier.

Taking this into consideration, the value of flexibility in this case can be approximated by the amount of energy consumption that can be shifted from the period where energy is the most expensive to the period where the energy is cheapest. In formulas, this reads:

$$V = \Sigma v_i + \zeta$$

$$\zeta = (p_{max} - p_{min}) * E_{avail}$$

where

V is the global value function for aggregation as explained earlier;

$\zeta$ indicates the economic value of flexibility for the supplier;

$p_{max}$ and $p_{min}$ indicate the maximal and minimal price per unit of energy over the day; and $E_{avail}$ is the total energy available for shifting from the peak time to base time.

In another specific example, consider a TSO focused on capacity. In order to respond to unexpected grid imbalances, a TSO will be interested in controllable power capacity, where it seeks power that is maximally available over a given period of time (e.g., during an entire year, or every day between 5 p.m. and 8 p.m. for an entire year). The global value function and economic term would then be:

$$V = E[\Sigma_{i=1}^{K} \Delta E_i / E_{peak} + \zeta]$$

$$\zeta = -[\sqrt{(\Sigma_{i=2}^{K}(E_i - E_{i-1})^2)}] * Q = -\text{volatility of energy}$$
available for balancing times a fixed fee.

In step 520 the global value function is maximized (i.e., solved for) in order to determine a dispatch function 524 that not only is able to provide the relative amount of power that should be given to each of the loads over particular time intervals, but also the control parameters for each load and their values during those time intervals based upon the power given. More specifically, the dispatch function maps every (allowed) energy consumption schedule of the virtual load to control parameter schedules of the individual loads so as to maximize the total value function V.

In other words, assuming a quantity of energy is available during a time interval of the time period, the dispatch function provides three functionalities; it: distributes all of that energy (as a percentage) amongst all of the individual loads; maps the energy for each load to a time-varying power in the time interval, using the optimization of the value function (i.e., power may change for a load during a time interval); and maps the power consumption during the interval to a set of control parameters and values using the inverse model associated with each load. As such, the dispatch function determined in 524 does not provide actual power levels for each load or actual parameter values, but will produce those levels and values when executed, for example in steps 544 and 548 when an actual power level for the virtual load is to be scheduled. In addition, the first functionality can readily be extended to allow for time-varying distribution of power—that is, power consumed within the interval may change as well as the distribution of power over the different loads.

In solving for the global value function the power consumed by the virtual load is restricted to be the only control parameter. The value function may be solved using a variety of techniques known in the art. In general, a solution cannot be found analytically, but a numerical search algorithm should be used that looks for the best solution.

One particular mathematical implementation first computes "off-line" an initial solution using standard techniques from constraint programming. During the online (real-time) phase Lagrange relaxation and constraint sampling is used to quickly approximate the optimal region. To predict the power consumption of each load, we use various implementations of regularized regression where we select the strength of the regularization using cross validation. For scheduling, a greedy search algorithm may be used. The greedy search algorithm computes the optimal energy consumption of each load and computes the gradient of the value function with respect to energy consumption. A priority is given to all loads by decreasing gradient, and then we reschedule the difference between optimal consumption (the sum of all optimal energy levels) and the total energy to be scheduled by varying the energy levels on the loads with highest priority first until we exactly schedule the requested amount. This implementation is part of a realization of the dispatch function discussed earlier. Indeed, starting from a given energy amount that has to be consumed by the virtual load in a given time interval, the greedy algorithm dispatches that energy over all loads in a way as to maximize the value function. Once the corresponding power profiles per load are computed, we convert these profiles into control parameter schedules using the inverse load models. Thus, the dispatch function is here the composition of two operations: applying the inverse load models to the resulting power profile of each load as has been computed by the greedy algorithm. Other techniques that may be used to maximize the global value function are global maximization procedures such as simulated annealing and genetic algorithms.

As mentioned, solving for the global value function provides a dispatch function able to provide the control parameters and their values for each load for each time interval of the time period in question. For example, once the solution above provides a percentage of the overall power to be dispatched to a particular load within a time interval, the dispatch function also provides the means to determine the control parameters and values necessary to consume that power during that time interval (which power might be varying over time within the time interval). This is done by using the inverse model of the particular load to translate power (not energy over an interval) into a control parameter schedule. The dispatch function preferably restricts the image of the inverse model to force uniqueness. Hence, the dispatch function maps every possible power consumption profile onto a schedule of control parameters.

These control parameters and their values are also in general time dependent. For example, not only will a set of control parameters and values be output for a particular load for a particular time interval, but also these values may vary during the time interval itself in order to adjust power consumption of the loads. For example, a set of laptops within a virtual load may be charged sequentially during a particular time interval. In other words, given a particular amount of energy to be consumed during a time interval, this energy may be consumed by charging the first laptop only for the first five minutes of the interval, a second laptop for the next five minutes, and only charging a third laptop for the last five minutes of the time interval. Thus, given a particular amount of energy for a given load in a time interval, the control parameters and values will provide the best consumption of energy over time, which is not necessarily an average consumption throughout the entire time interval. Since the control parameter of the virtual load is the instantaneous energy consumption, varying this control parameter will often yield varying control parameter values for the individual loads. Inversely, even if the power level of the virtual load is kept constant, the control parameter values of the individual loads might change over time (based upon the dispatch function) because of the evolution of the individual load states as governed by the load models.

Finally, it is clear that by virtue of the value function, the dispatch function always schedules power in a way that is most valuable to the virtual load user. E.g., when considering the value function of an intra-day dispatcher who needs fast-response flexibility, loads having short response times will be scheduled before the other loads comprising the virtual load. In such a way, the virtual load will have minimal response time yielding a larger value of the total value function.

Scheduling Aggregated Power

Figure 13:
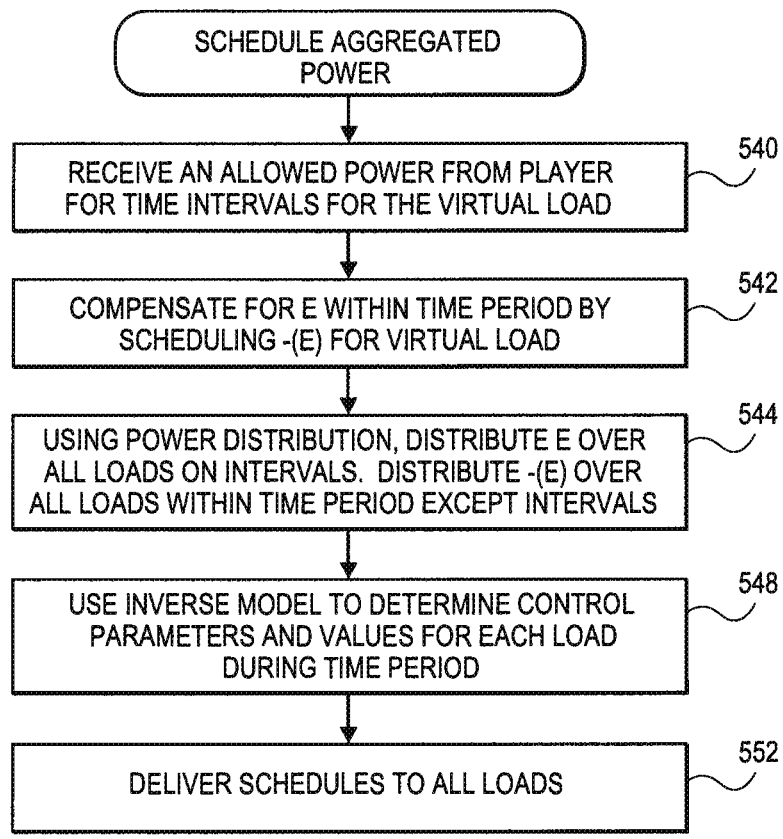
FIG. 13 is a flow diagram describing one embodiment by which aggregated power may be scheduled for individual loads via a virtual load.

FIG. 13 is a flow diagram describing one embodiment by which aggregated power may be scheduled for individual loads via a virtual load. Advantageously, an energy player may simply deliver a single power schedule to a virtual load and then an embodiment of the present invention will automatically schedule that power for each of the individual loads within the virtual load and provide control parameters and values for the time period, while ensuring that the constraints for all individual loads are still satisfied.

In step 540 a power level adjustment is received from an energy player for a particular time interval for a virtual load. This power level may be received after the energy player has exercised flexibility in order to increase or decrease power to the virtual load relative to its original reference curve (discussed below). The energy player will have entered a positive or a negative power level relative to the reference curve (using standard conventions, a positive value indicating the load should use less energy, and a negative value indicating the load should use more energy).

Of course, power level adjustments may be received for an entire time period as well as for any number of time intervals within a time period. It may be assumed that the power level entered by the energy player is an allowed value that falls within upper and lower boundaries as the system is capable of checking that condition. Note that for ease of presentation, the energy player always supplies a constant power level over one (or more) time intervals. However, this only implies that the amount of consumed energy over the time interval should equal the energy consumed over that interval at the given constant power level. Hence, in general, the virtual load may consume the given amount of energy at a time-varying rate during the time interval.

In general, total energy consumption for a given load will quite often (depending on the constraints) remain constant when measured over a full load cycle. For example, a cold store may require that its compressor be run approximately four hours each day in order to keep its food frozen. If an energy trade requires that an hour of compressor time be added early in the day (in order to distribute excess power), then an hour of compressor time should be subtracted at some point during that day in order that the compressor be run only for four hours. There are, however, certain conditions providing an exception to this general rule in which the total energy consumption during a particular time period need not remain constant. This is the case whenever the constraints are sufficiently permissive. When this happens, the control system may move flexibility from one load cycle to another. This will be decided once again based on the (expected) value of the value function at later stages.

For example, a cold store having a wide temperature band (and operating during the time interval in question at the upper range of that band) may be able to use an extra 1 MWh of energy (thus, lowering its temperature) and not need to subtract an extra 1 MWh of energy at some point during the rest of the day. Because the cold store in this example can "handle" the extra energy and still satisfy its constraints, it is not necessary to compensate by removing the extra energy at some other time. As explained above, the schedule will be chosen in such a way as to maximize the value function. E.g., in case the additional 1 MWh is cheap, the system could use this to compensate one expensive MWh one day later (in another load cycle).

Assuming that total energy consumption for the virtual load must be kept constant, step 542 first determines the total energy to be added to the time period by summing all power levels (positive or negative) for all designated intervals as received above. Next, the step compensates for the total energy to be added (or subtracted) to the time interval (or intervals) by scheduling a corresponding negative of the total energy (the compensating energy) somewhere else (other than the designated intervals for which power levels were received) during that time period for the virtual load. In other words, the total additional energy scheduled by the energy player in step 540 should sum to zero when combined with the compensating energy scheduled in step 542. Of course, the negative total energy will not be added to the time interval or intervals selected by the energy player in step 540, and may be added to a single time interval or may be divided among multiple time intervals. When the constraints on each of the individual loads are strict, compensation may happen on each and every single load.

Scheduling the negative total energy during the time period for the virtual load may be accomplished in different ways. In one example, such scheduling may be accomplished using the techniques described in steps 740-752 (and may already have been performed in which case step 542 is not needed). In this example, the designated intervals in which the energy player desires to schedule additional energy are excluded from the set under consideration in step 740. Once the loop exits at step 760, then the energy level distribution decided most recently in step 740 will be used to implement step 542. This compensation procedure can be modified, e.g., to minimize the economical impact on the energy player's portfolio.

Once the negative total energy has been scheduled in the form of compensating power levels for particular intervals for the virtual load, these energy values (total energy to be added and compensating energy) are ready to be distributed amongst the actual loads. In step 544 the desired power level adjustments are distributed over all individual loads within the virtual load for the particular time intervals in question. This distribution is performed using the energy distribution percentages from the dispatch function determined in step 524. In other words, a particular energy level adjustment for a particular time interval will be distributed over all loads according to the distribution percentages. In addition, in step 544 the compensating power levels determined in step 542 for particular time intervals will also be distributed over all loads using the distribution percentages. Note that the compensating power levels will not be distributed over those time intervals designated in step 540 by the energy player.

In step 548 each desired power level per interval (adjustment or compensating) distributed to an individual load may be added to the original reference curve value for that load in order to obtain desired, absolute power levels for all intervals. In other words, if a particular load originally calls for 4 MW during a time interval, and the compensating power level for that load is −1 MW, then the absolute power level for that interval will be 3 MW. Next, these absolute power levels for a particular load are input to the inverse model for that load in order to determine the control parameters and their corresponding values for the time interval or intervals. Each load is similarly handled in this fashion. Preferably, step 548 uses the dispatch function determined in step 524 to input power levels to the inverse models.

In step 552 the parameters and values are delivered to each load using, for example, network 140 and suitable hardware and software.

Reference Curves

Figure 14:
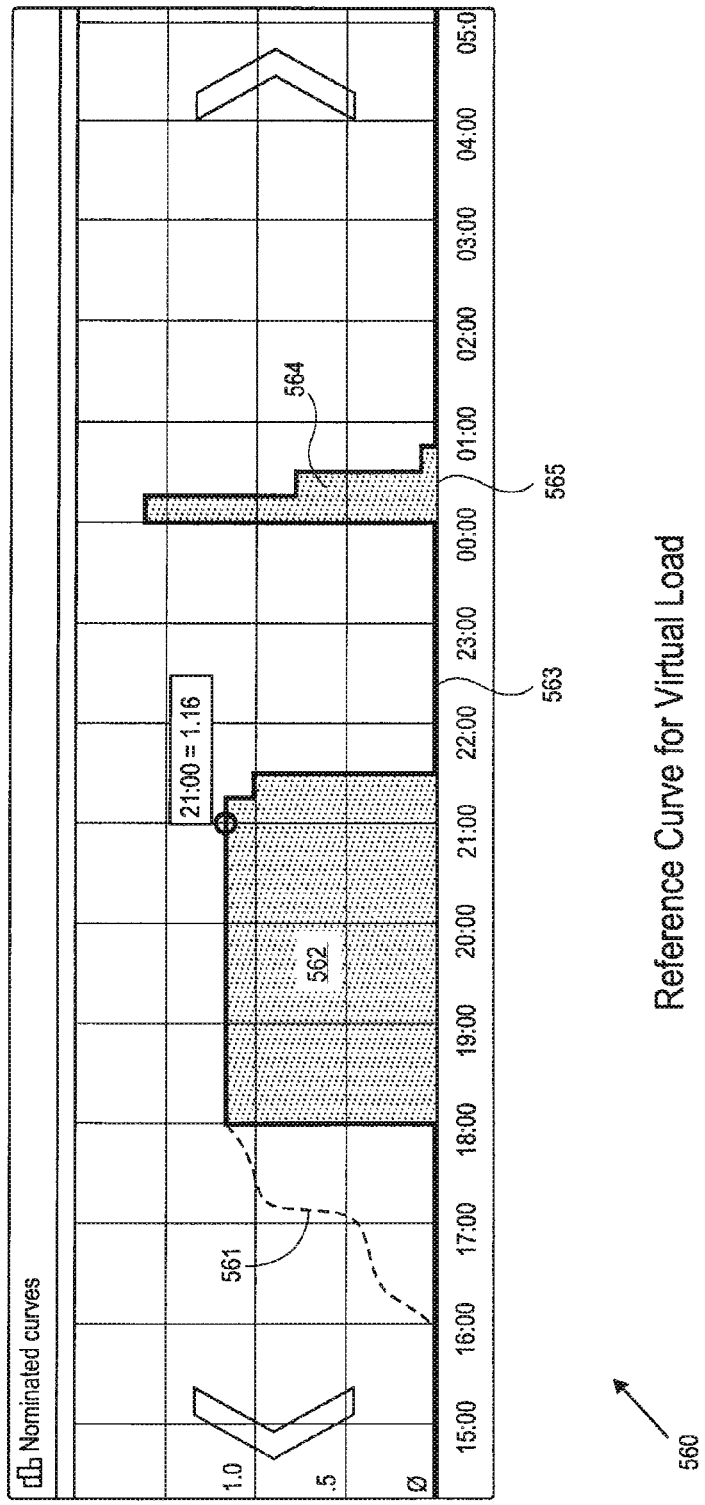
FIG. 14 illustrates an exemplary reference curve for a particular virtual load.

FIG. 14 illustrates an exemplary reference curve 560 for a particular virtual load. In this example, any number of laptops have been aggregated into a single virtual load and reference curve 560 illustrates the forecast power curve for the next day that will be nominated to an energy supplier. Of course, the curve could be shifted slightly to the left so that all power demands fall exactly into a single day. The reference curve illustrates the amount of power needed at particular times in order to charge the batteries of all laptops within the virtual load.

As known in the art, the energy market uses the concept of a nominated reference curve to attain market equilibrium (between supply and demand). Each day for instance, an energy supplier submits (or nominates) a reference curve to the TSO (for example) listing an energy schedule for the next day which details what its energy supply will be and what its energy demand will be. Supply must meet demand otherwise the supplier will be penalized by the system operator. To help an energy supplier meet that requirement, typically a large industrial consumer of power must likewise nominate a reference curve for the next day showing its power consumption during each time interval.

Accordingly, because the control system 160 (an intermediary) has aggregated many loads into one relatively large virtual load, this intermediary may be treated like a large industrial consumer and may also nominate a reference curve each day to an energy supplier (or perhaps to a system operator) showing its expected demand across all of its loads for the next day. The energy supplier will then use this reference curve of the virtual load in preparing its own reference curve for the system operator. Advantageously, even though the intermediary nominates a particular reference curve, the techniques of the present invention allow the intermediary to provide flexibility in the power used during each time interval. Such flexibility allows an energy player (such as the energy supplier) to adjust the virtual load in response to an excess or shortfall of power during the scheduled day, allowing an energy supplier to avoid penalties, to assisting the system operator in maintaining a stable grid, and allowing the owner of each load to save money.

Region 562 illustrates that charging of all laptops begins at 6 p.m., steps down slightly at 9:15 p.m., and ends at 9:30 p.m. Early in the morning (or optionally, later that evening), charging begins again as shown in region 564, steps down, and then ends at approximately 12:45 a.m. It should be noted that an actual, unmodified power consumption of laptops would present a slightly different reference curve. In this example, a potential reference curve has been modified slightly in two different ways (referred to as pre-aggregation) in order to present the reference curve as shown.

Firstly, a limitation has been imposed by the owner of the virtual load that all charging shall begin at 6 p.m., even though laptops may be connected to the grid as early as 4 p.m. Broken line 561 shows charging that could actually occur earlier if this limitation were not imposed. For example, laptops would be connected to the grid randomly as early as about 4 p.m. and thus the reference curve would increase gradually as shown at 561. But, by imposing a limitation that charging of all laptops shall not begin until 6 p.m., the owner of the virtual load increases the accuracy of this forecast reference curve at a minor expense in flexibility. In other words, as long as user constraints are still met (i.e., "I need my laptop fully charged by 8 a.m. in the morning"), the owner of the virtual load may impose this type of limitation dictating when power must be used, when power may not be used, a minimum power that must be used at certain times, a maximum power that must be used at certain times, and other types of limitations on power usage. In general, this is a limit on the timing and quantity of the power consumption. This is done to maximize the reliability of the forecast energy consumption (i.e., to have a stable nomination curve) as it allows us to make use of various portfolio effects.

Another category of limitation that may be imposed by the virtual load owner relates to when power flexibility is offered to an energy player. In general, a given virtual load is available to have its power steered in either direction during the course of the day as long as such steering falls within the constraints of all of the individual loads. But, a virtual load owner may impose a limitation that the virtual load has no flexibility at particular times. For example, from 6 p.m. until midnight the virtual load is available for power steering (of course, from 9:30 p.m. until midnight the load is only available to accept excess power rather than use less power), but after midnight the virtual load owner has decided that no flexibility shall be offered. In other words, after midnight an energy player may not offer excess power to the virtual load nor reduce power to the virtual load. In this example, no flexibility is offered after midnight because this is a critical time in the charging of a vehicle's battery. Of course, each virtual load will be unique and the virtual load owner is free to impose such a limitation that flexibility shall not be offered at particular times.

There are mainly two reasons to limit the timing and quantity of offered flexibility. First of all, these limits increase the reliability of the offered flexibility. Indeed, when we always offer the maximal amount of flexibility there is a probability of not being able to deliver what is promised. As a consequence, there would be penalties. Secondly, we only offer flexibility when we can operate the load easily (again to enhance robustness and reliability of the forecast). For example, a standard Li-ion electric vehicle battery charges at a constant power level until it is almost full at which time the power level decays exponentially. Since it is much harder to schedule exponentially decaying power consumption, we only offer flexibility when the battery is in the constant power state.

A reference curve may be created in many different manners. In one example, historical data of the individual loads may be reviewed in order to construct a reference curve for the virtual load. In another implementation, the reference curve is computed based on forecasts of the individual energy consumptions together with a statistical argument to minimize the uncertainty of the reference curve.

Exemplary User Interface

As mentioned in FIG. 6, an energy player will have access to an innovative user interface (typically via a Web application running on the control system 160) that allows the player to execute energy trades using the virtual load. Advantageously, the user interface presents upper and lower boundaries for power levels per time interval indicating to what extent the virtual load is available to consume excess power or is available to handle a reduction in power within the constraints of all the individual loads. These power levels are relative to the nominated reference curve from the virtual load. The user interface thus: allows the energy player to schedule flexibility in a large portfolio of loads visually, dynamically recalculates these boundaries when an energy trade is made, and performs energy compensation throughout the time period if necessary. Of course, a user interface may be implemented in many different manners and the invention is not limited to the exemplary user interface shown herein. Whenever flexibility is scheduled, the boundaries are able to change dynamically.

Figure 15:
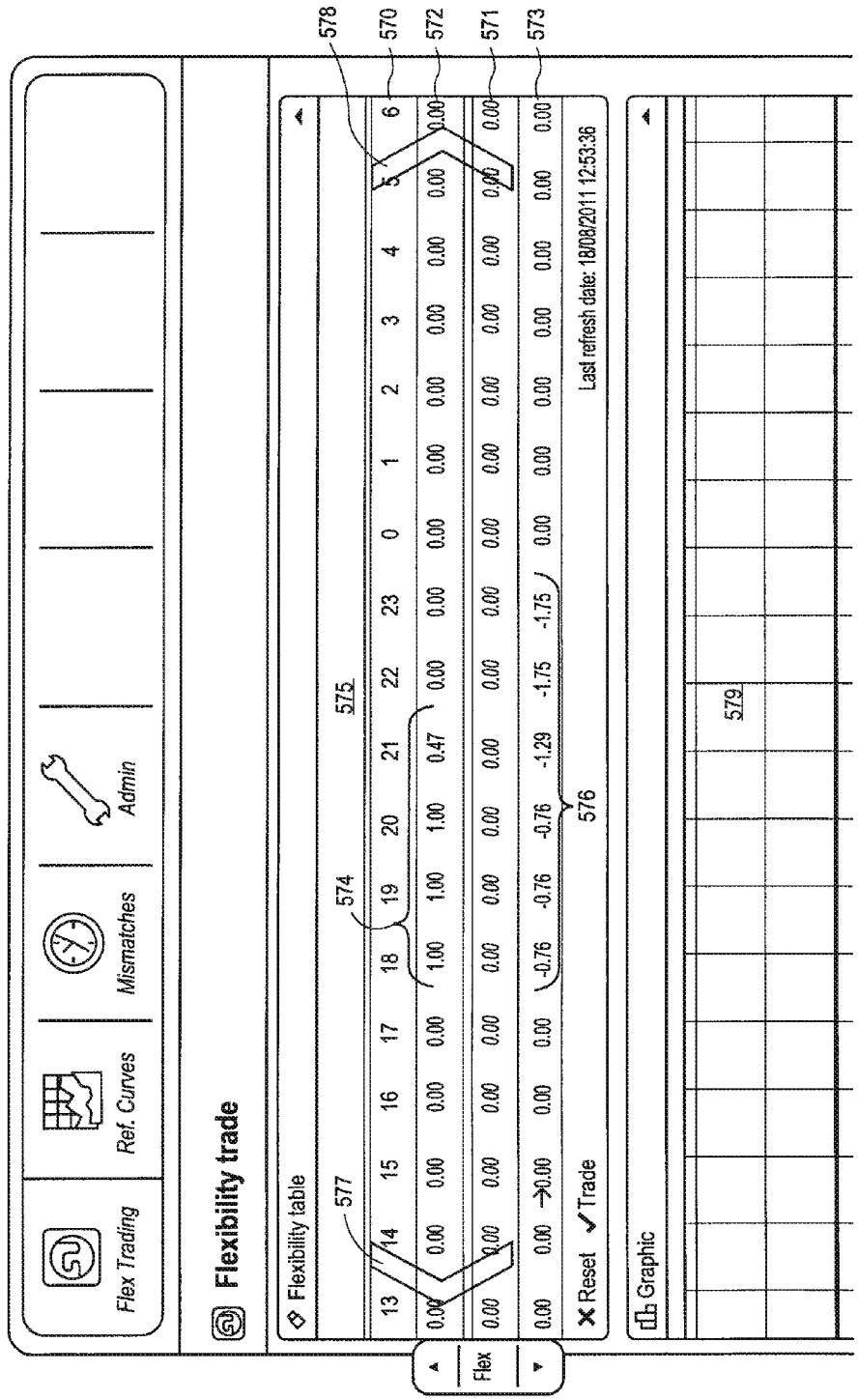
FIG. 15 illustrates a flexibility table created by the present invention after receipt of the reference curve for the virtual load.

FIG. 15 illustrates a flexibility table 575 created by the present invention after receipt of the reference curve for the virtual load. The table is a user interface that an energy trader may use to execute trades for the virtual load within a particular time period (such as a 24-hour day). Typically, the time horizon shown is "today" and "tomorrow," as trading of electricity is done day-ahead and corrections happen intra-day.

The flexibility table shows a row 570 showing each time interval of the time period in question (typically the next day schedule of power nominated the previous day by the virtual load owner). In this particular example, each time interval is 1 hour, although each hour may be expanded to show in detail the 15-minute increments within any particular hour. A flexibility row 571 is an input portion of the user interface allowing a trader to specify precisely what amount of power (i.e., more power or less power) he desires that the virtual load shall use during a particular time interval. A row 572 lists values for an upper bound of power that may be chosen by the trader during a particular time interval, and a row 573 lists values for a lower bound that may be chosen.

Note that the boundary amounts of power that may be traded are relative to the reference curve of the virtual load. By convention, positive amounts at the bounds indicate power that the virtual load can do without, while negative amounts indicate power that the virtual load can take on. In other words, a negative value in row 573 indicates a maximum amount of power—over and above what exists in the reference curve—that the virtual load can take on for a particular interval. For a given time interval both bounds may have positive values (indicating that the virtual load may be asked to consume less energy), both bounds may have negative values (indicating that the virtual load may be asked to consume more energy), or, the upper bound may be positive and the lower bound may be negative (indicating that energy may be reduced or increased within the bounds specified).

An energy trader, or other user of the interface, may view other portions of the day by scrolling through the time intervals using arrows 577 or 578. For example, placing the cursor over arrow 577 will display the time intervals for the day from midnight through 1 p.m. that are currently not shown.

In this example, the table has been created after nomination of the reference curve by the virtual load owner, and shows a representation of the table before any trades have been executed by an energy trader. Accordingly, the middle flexibility row 571 contains all zeros because an energy trader has not yet chosen to make any trades during those time intervals. At the time interval between 6 p.m. and 7 p.m. (indicated by the column below the numeral 18), the table indicates that a trader may force the virtual load to reduce its power consumption by as much as 1 MW, or may force the virtual load to consume as much as 0.76 MW more power, all relative to the original reference curve. The table also shows that there is flexibility in the virtual load for consuming less power 574 between the hours of 6 p.m. and 10 p.m., and for consuming more power 576 between the hours of 6 p.m. and midnight. Region 579 is blank as no trades have yet been performed.

Before any particular time interval (indeed, even a few minutes before), a trader may execute an energy trade (dictating that the virtual load consume more power or consume less power) for that particular time interval or for any later time interval. Once power levels are entered into the flexibility row, and the trade is confirmed, the system will then proceed to perform energy compensation and recalculation of upper and lower boundaries as will be described below.

Figures 16A, 16B:
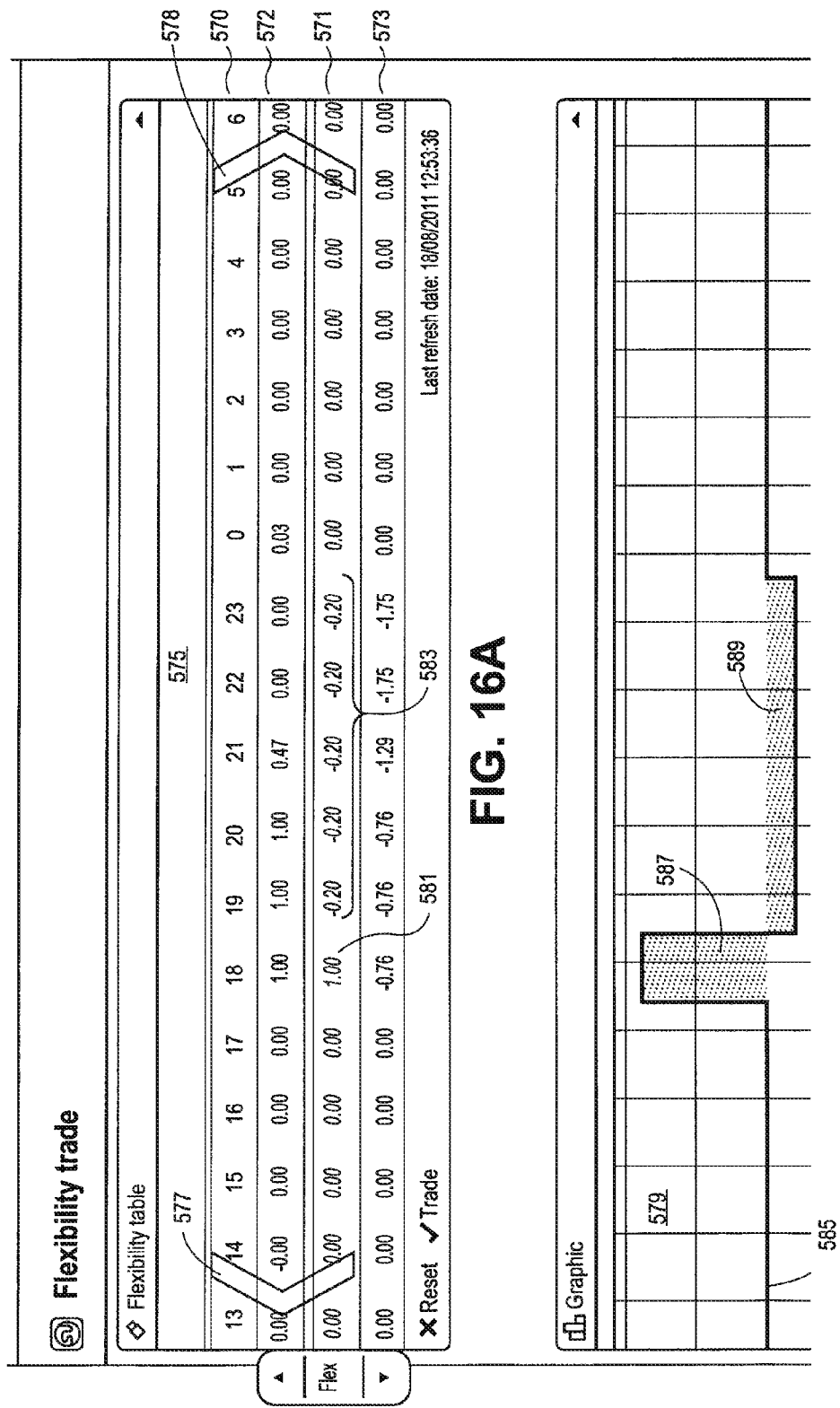
FIG. 16A illustrates the same flexibility table after an energy trader has executed a trade.
FIG. 16B illustrate graphically the flexibility row from FIG. 16A.

FIG. 16A illustrates the same flexibility table after an energy trader has executed a trade. At sometime before 6 p.m. the energy trader has realized that he has an imbalance in his portfolio and that he has a shortage of approximately 1 MW, for example. Accordingly, he realizes that during the time interval at 6 p.m. there is flexibility in the virtual load and that the virtual load is able to accept a reduction in power by as much as 1 MW. (Of course, during the same time interval the virtual load is also able to consume as much as 0.76 MW, but that flexibility is of no interest to the trader at this particular point in time.) Accordingly, the trader enters a value 581 of 1.00 in the flexibility row at the time interval of 6 p.m. and hits the return key. The system validates that this value is in between the upper and lower acceptable power levels for the virtual load during this time interval and then performs energy compensation and recalculation of boundaries in order to display the flexibility table as shown.

Because the trader has asked the virtual load to consume 1 MW less power at 6 p.m., energy compensation dictates that the virtual load should consume an equivalent 1 MW more of power during any of the other later time intervals during that time period. (Since the trade was executed just before 6 p.m., the time intervals before 6 p.m., and the time interval of 6 p.m. itself, are not available for energy compensation.) Accordingly, the system automatically assigns energy trades 583 of −0.20 during the time from 7 p.m. until midnight. This means that during this 5 hour time period, the virtual load will be asked to consume 1 MW more power. The system also automatically performs recalculation of the minimum and maximum power levels in rows 572 and 573, although in this simple example the recalculation does not result in any changes.

Considering another example in which recalculation would occur, if the trader also forces the virtual load to consume 1 MW less energy from 7 p.m. until 8 p.m. as well, then it will be imperative that the virtual load (in this case, laptops) be required to only consume more energy after 8 p.m. Accordingly, the upper and lower boundaries will only show negative numbers, indicating that the energy trader is constrained to only force the virtual load to consume more energy during these time intervals. In other words, if the energy trader is going to force the laptops to do without a certain amount of power before 8 p.m., the energy trader will be constrained to only giving more power to the laptops after 8 p.m. The energy trader will not be allowed (because of the recalculated boundary conditions) to schedule less power for the laptops after 8 p.m. In this fashion, the present invention considers all constraints of the individual loads (and of the virtual load) in real-time right after an energy trade is made, performs energy compensation and recalculation, and presents an updated user interface to the energy trader reflecting a real-time view of which energy trades are henceforth allowable during a given time period for the virtual load.

FIG. 16B illustrate graphically 579 the flexibility row 571 from FIG. 16A. Because flexibility is represented relative to the original reference curve, the reference curve is shown as a straight line 585. Any changes to that curve indicate that more or less power (relative to the original power levels chosen) will be used by the virtual load. Accordingly, region 587 shows graphically that at 6 p.m. the energy trader has chosen to require the virtual load use 1 MW less of power. Region 589 shows the energy compensation effect in which the virtual load will use 1 MW more power during later time intervals.

Of course, the trader may choose any time interval for an energy trade, may choose to require a virtual load to consume more energy, may select more than one time interval for energy trades, and may adjust compensation values in the flexibility row once the system places them there. Once energy compensation and recalculation have been performed automatically and the results are displayed in the flexibility table to the user, the energy trader may act upon his desired trade by pressing the "trade" button. The system then schedules these power changes to the virtual load as discussed above. For example, if the reference curve calls for 4 MW of power to be consumed at a particular time interval, and the trader decreases that amount by 1 MW, the algorithm sends a schedule to the virtual load that calls for 3 MW during that interval. Of course, the convention may be changed and the schedule may indicate a value of −1 MW which is then combined with the value from the reference curve.

Figures 17A, 17B:
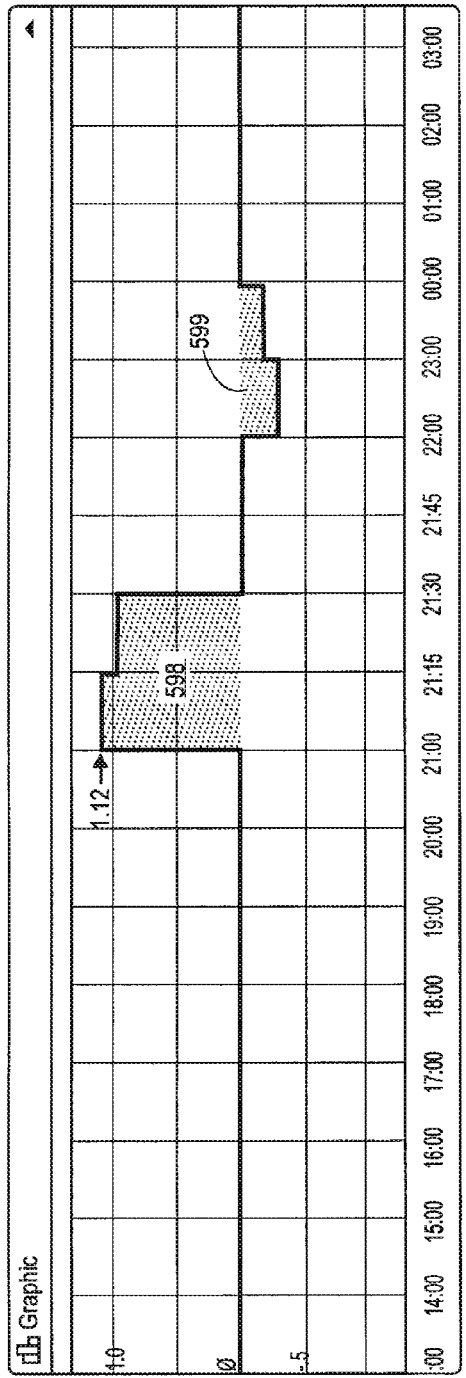
FIG. 17A illustrates a flexibility table used by an energy player or an energy trader to make energy trades using the present invention.
FIG. 17B is a graphical representation of the trades and compensation of FIG. 17A.

FIG. 17A illustrates a flexibility table used by an energy player or an energy trader to make energy trades using the present invention. Both portions represent in some fashion the nominated reference curve of the virtual load from the previous day and its flexibility. The flexibility table illustrates during the day of, how the energy trader may make energy trades in real time using the power flexibility of the present invention.

The flexibility table shows a row 590 showing each time interval of the time period in question (typically the next day schedule of power nominated the previous day by the virtual load owner). In this particular example, each time interval is 1 hour, although each hour may be expanded 594 to show in detail the 15 minute increments within any particular hour. A flexibility row 591 is an input portion of the user interface allowing a trader to specify precisely what amount of power (i.e., more power or less power) he desires that the virtual load shall use during a particular time interval. A row 592 lists values for an upper bound or the maximum amount of a reduction in power that may be chosen by the trader during a particular time interval, and a row 593 lists values for a lower bound, or the maximum amount of an increase in power that may be chosen. Note that the upper and lower bounds of power that may be traded are relative to the reference curve of the virtual load.

Although the flexibility table illustrates a real world example in which a particular trade was made (explained further below), it lends itself to other interpretations that may be used for illustration purposes. For example, consider that some time after nomination of the reference curve but before the time of 9 p.m., the energy trader notices an imbalance in his portfolio and desires to help balance his portfolio by exercising flexibility in the virtual load (i.e., forcing the virtual load to consume more power or to use less power in certain time intervals). The time interval beginning at 9 p.m. shows that the power flexibility of the virtual load is 1.16 MW (less power) and 0.92 MW (more power). The convention used is that positive numbers indicate how much less power the virtual load may be forced to do without, while negative numbers indicate how much extra power may be forced upon the virtual load. These values are relative to the original reference curve of the virtual load. For example, the reference curve indicates that at 9 p.m., for example, the virtual load is forecast to consume 1.16 MW. Therefore, the maximum flexibility value at 9 p.m. (the amount of power that the virtual load may be forced to reduce) is exactly 1.16 MW, because the virtual load cannot be forced to consume power less than zero.

Accordingly, before the energy trader makes the trade before 9 p.m., the input in the flexibility row 591 is blank at the 9 p.m. time interval and its minimum and maximum values are positive numbers. This indicates that while the energy trader may force the virtual load to use less energy within a certain range, it may not ask the virtual load to consume more energy. The energy trader decides to force the virtual load to use exactly 1.12 MW less power in the time interval between 9 p.m. and 9:15 p.m. and enters that number in the flexibility row 591. Any number entered that is not between the values of 0.92 and 1.16 will be rejected by the user interface.

Once this value is entered and accepted by the user interface the invention automatically performs energy compensation (redistributing an equal amount of negative energy during other time intervals within the time period) and automatically recalculates the upper and lower bounds during the time period. Energy compensation and recalculation will be discussed in greater detail below. In another example, consider the time interval at 10 p.m. The boundaries for an energy trade are between 0 and −0.50, indicating that the trader may force the virtual load to consume more energy up to a quantity of 0.5 MW.

In actuality, sometime before 9 p.m. the energy trader has enter the values of −0.3 and −0.2 for the time intervals at 10 p.m. and at 11 p.m. This indicates that the laptops of the virtual load will be forced to consume more energy later in evening. Intuitively, it is then realized that the laptops should consume less energy earlier in the evening. The present invention handles this situation by performing energy compensation. Automatically, once these values are entered and traded (sometime before 9 p.m.), the automatic energy compensation dictates that the virtual load shall consume less energy in the time intervals between 9 p.m. and 9:30 p.m. by automatically entering the values 1.12 and 0.97 in the flexibility row 591 corresponding to these time intervals. This means that the laptops must use less energy earlier in the evening. Also, the energy compensation changes flexibility row values slightly during the time interval from 9:30 p.m. until 10 p.m. The values in the flexibility row from 9 p.m. until midnight still sum to zero because the energy used at 10 p.m., for example, represents one hour's worth of power, while the energy used at 9:45 p.m., for example, represents 15 minutes of power.

In addition to energy compensation, the system will automatically recalculate upper and lower boundaries for all time intervals later than 9 p.m. Accordingly, notice that during the time from 9 p.m. until 9:30 p.m. it is now not possible for the energy trader to force the virtual load to consume more energy; in fact, the virtual load may only be forced to consume less energy in fairly large amounts. Of course, all of the numbers in the different rows from 9 p.m. until 10 p.m. can be collapsed into a single number representing the time interval of one hour at 9 p.m. I.e., the user interface also provides the ability to reduce the amount of information presented by listing power consumption and boundaries per hourly interval. Since all data is expressed in terms of power, the numbers shown when using the hourly view is simply the average of the numbers individually shown in all quarters.

FIG. 17B is a graphical representation of the trades and compensation of FIG. 17A. The graphic mirrors the flexibility table above and shows graphically the corresponding effect on flexibility by the trader's decision before 9 p.m. to adjust the time intervals at 10 p.m. and at 11 p.m.

The graphic may also be used to explain in a different way the energy compensation that occurs after a trade is made. Assume for the moment that after nomination of the reference curve, but before 9 p.m. (an energy trader may make a trade concerning the time period at 9 p.m. up until just a few minutes before that time), an energy trader desires to use flexibility of the virtual load in order to make a trade concerning region 599 (10 p.m. until 12 a.m.). Accordingly, region 599 illustrates that the energy trader has dictated that the virtual load shall use more power from 10 p.m. until 12 a.m. as shown by the energy represented in region 599. As will be discussed in greater detail below, energy compensation typically occurs to balance this greater amount of energy consumed with a corresponding lesser amount of energy consumed somewhere else during that time period for the virtual load. Accordingly, the present invention automatically dictates that the virtual load shall consume less energy as shown in region 598 stretching from 9:00 p.m. until 9:30 p.m. The amount of energy reduced to the virtual load in region 598 is equivalent to the amount of energy consumed in region 599. As discussed above, there are exceptions to this requirement that an energy trade for a virtual load must always be compensated by an equal amount of negative energy during the time period in question.

Finally, apart from the visual user interface, all functionality can be made available in other ways as well that would more easily enable automation. In another example, the virtual load can be scheduled using a API that is programmatically accessible from the Internet. Data and objects are then communicated using a standardized representation such as XML or JSON.

Create Flexibility Table

In order to create a flexibility table representing a virtual load for presentation on a user interface to an energy player, it will be useful to have the nominated reference curve from the virtual load for the next time period (typically, the next day) and the boundary conditions for each time interval.

Figure 18:
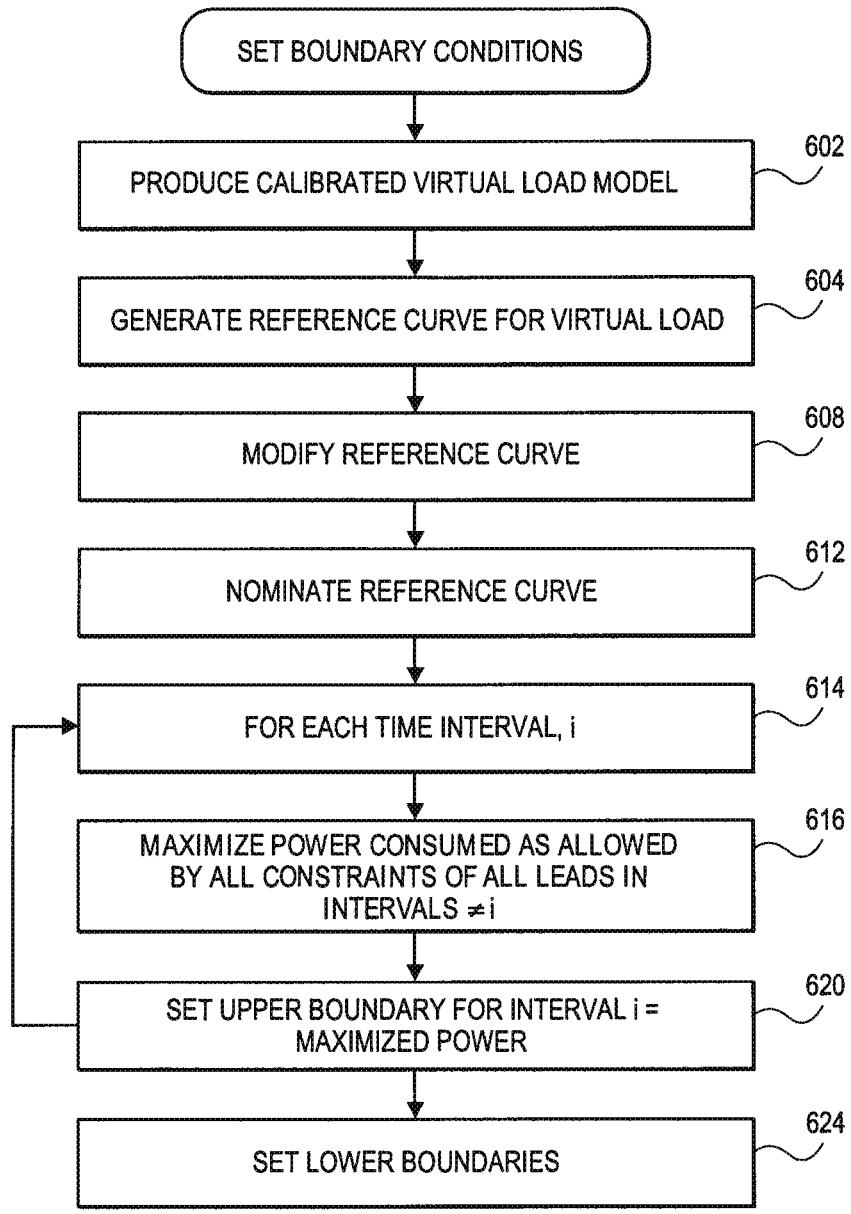
FIG. 18 is a flow diagram describing one embodiment by which boundary conditions are determined for the flexibility table.

FIG. 18 is a flow diagram describing one embodiment by which boundary conditions are determined for the flexibility table. In general, it is useful to start with the reference curve for the virtual load. There are different ways to produce this reference curve. In the simple case when the virtual load consists of a single load, historical data for this single load may be reviewed in order to determine a reference curve for that load for a given day. Even when the virtual load consists of many loads, historical data for each individual load may be combined in order to develop a reference curve for the entire virtual load.

In another example, historical data may be combined with forecast data for the coming day in order to produce the reference curve. For example, a review of historical data might reveal a correlation with external temperature (in the case of a cold store). If the external temperature can be predicted for the next day, the temperature may be used to produce the reference curve, even if that temperature is not seen in the historical data and extrapolation is needed.

Steps 602 and 604 describe a more automated method to produce a reference curve for the virtual load. In step 602 a calibrated virtual load model is produced. A model for the virtual load may be constructed by combining the load models for the individual loads in combination with the results from the global value function which was solved in step 520. The maximization of the global value function produced a dispatch function for determining how a quantity of energy assigned to the virtual load would be distributed to each of the individual loads, and for determining control parameters and their values necessary to achieve those individual energies for the individual loads. As long as the load portfolio does not change, the virtual load model remains the same except for a regular recalibration of the individual load models.

A calibrated virtual load model means that all variables of the model are given values that are compatible with historical data. This means first of all that the individual load models are up to date such that both the dynamics of the model as well as the user statistics are correct. In addition, the global value function in general also contains terms describing the value of flexibility. These terms include parameters used in modelling, e.g., the market value statistics of flexibility. Bringing these parameters up to date is also part of the calibration process.

Once produced, the calibrated virtual load model will accept as input constraints and their values, the possible control parameters for all individual loads, the state of each individual load, and possible forecast parameters and values for the individual loads. For example, the next day temperature may be a forecast parameter used with a cold store to help predict the power it will require for the following day. Optionally, historical data may also be input into the virtual load model. In step 604 the calibrated virtual load model may be used as known to one of skill in the art to output all the best relevant information for the coming day in order to produce a power curve, or reference curve, for the virtual load.

In step 608 the reference curve may optionally be modified in different manners to make it more predictable. This modification is done using pre-aggregation limitations as described earlier. Unpredictable reference curves, i.e., inaccurate power demand forecasts, yield lower reliability in available flexibility. One modification is to cluster the energy consumption in time in order to make that portion of the reference curve more predictable. For example, as discussed above, the reference curve may be modified by requiring that power may be only consumed at certain times, e.g., only allowing laptops to begin charging at 6 p.m., thus eliminating the uncertainty in power consumption before 6 p.m. Also, the reference curve may be modified by dictating that energy flexibility is not available during certain times, essentially limiting the flexibility window in time. The overall result of these modifications is to increase the predictability of the reference curve, thus providing confidence in flexibility at a particular time and increasing the value of that flexibility. These modifications may be introduced by adding additional (synthetic) hard constraints on the virtual load, which require that flexibility is not available at certain times.

As mentioned earlier, pre-aggregation is done to improve accuracy of the forecasts of both energy consumption (reference curve) and energy flexibility. In general, pre-aggregation may be done as follows. Using the distribution of initial load states (as introduced earlier) we compute error bands on the energy consumption and available flexibility of the virtual load. Using the global value function, we compute the expected cost incurred by misforecasting the initial state of each load for any given reference curve and any given flexibility. We then minimize that cost to select the optimal "pre-aggregated" reference curve together with the optimal amount of flexibility to be offered.

In step 612 the owner of the virtual load nominates the reference curve to its energy supplier (or other energy player as appropriate) so that the energy supplier may take this reference curve into account when it nominates its own supplier reference curve to a system operator. Of course, the virtual load may nominate its reference curve directly to a system operator or other entity. This step may also occur at a later time, or as required by an energy player.

Step 614 iterates over all time intervals for the time period in question for the virtual load, performing steps 616 and 620 one interval at a time, initially to calculate the upper boundary. The general idea is that it is assumed that the total energy consumed by the virtual load in any given time period should be constant; thus, if power reduction is to be maximized in a given time interval, then the other time intervals in total must be capable of increasing power consumption by the same maximal value, and vice versa. Accordingly, for a given interval, i, in order to determine the upper boundary (or maximum amount of power that the virtual load could be forced to do without), step 616 maximizes the total power able to be consumed (as allowed by all constraints of all loads) in all intervals other than interval i. Once a value for total maximum power able to be consumed is determined, the upper boundary for interval i is assigned that value.

Note that the reference curve is not fundamentally used during the above computation as the procedure is focussing solely on the maximal/minimal amount of energy consumption. However, when we represent the flexibility, we do use the reference curve, as all power flexibility is expressed as being relative to the reference curve.

In one embodiment, step 616 is performed by using an iterative search process to determine the total maximum power. Other techniques may be used such as analytic solutions whenever the underlying load models are sufficiently simple. In one embodiment, total power able to be consumed is determined by creating control parameters schedules according to possible power values, evolving the system over the full load cycle (using the load model), and checking if at all times, all constraints are satisfied.

Once the upper boundaries have been determined for all time intervals, the lower boundaries (or maximum amount of power that the virtual load could be forced to consume) for the flexibility table are determined in step 624. Step 624 is performed in a similar fashion as steps 614-620 except that instead of maximizing the power consumed in all other intervals, step 624 attempts to maximize the power able to be reduced in all intervals except for the current interval. Once the total maximum power able to be reduced is determined, then the lower boundary is set equal to that value for the current time interval. Once the lower boundaries have been set, then both sets of boundary conditions are stored in a database for later use or are ready to be displayed within the flexibility table for the time period in question.

It is possible, however, that conditions may change before trading begins and that the boundary conditions need to be recalculated. For example, it is possible that one of the individual loads may drop out of the portfolio of the virtual load, that an external parameter may change (e.g., the external temperature may be different from that expected in the case of a cold store), that a constraint may change on the loads, that a forecast changes, or other changes may occur such as the load state that differs from the expected or its dynamics that differ from what the model would predict. In this situation the boundary conditions may be recalculated by performing step 602 and then by performing steps 614-624.

Once the reference curve has been obtained and the upper and lower boundary conditions have been calculated, then a flexibility table may be created and displayed as illustrated. The time intervals and the overall time period will be known by virtue of the reference curve, and the middle flexibility row will initially be all zeros as no trades as of yet have been executed.

Execute an Energy Trade

Figure 19:
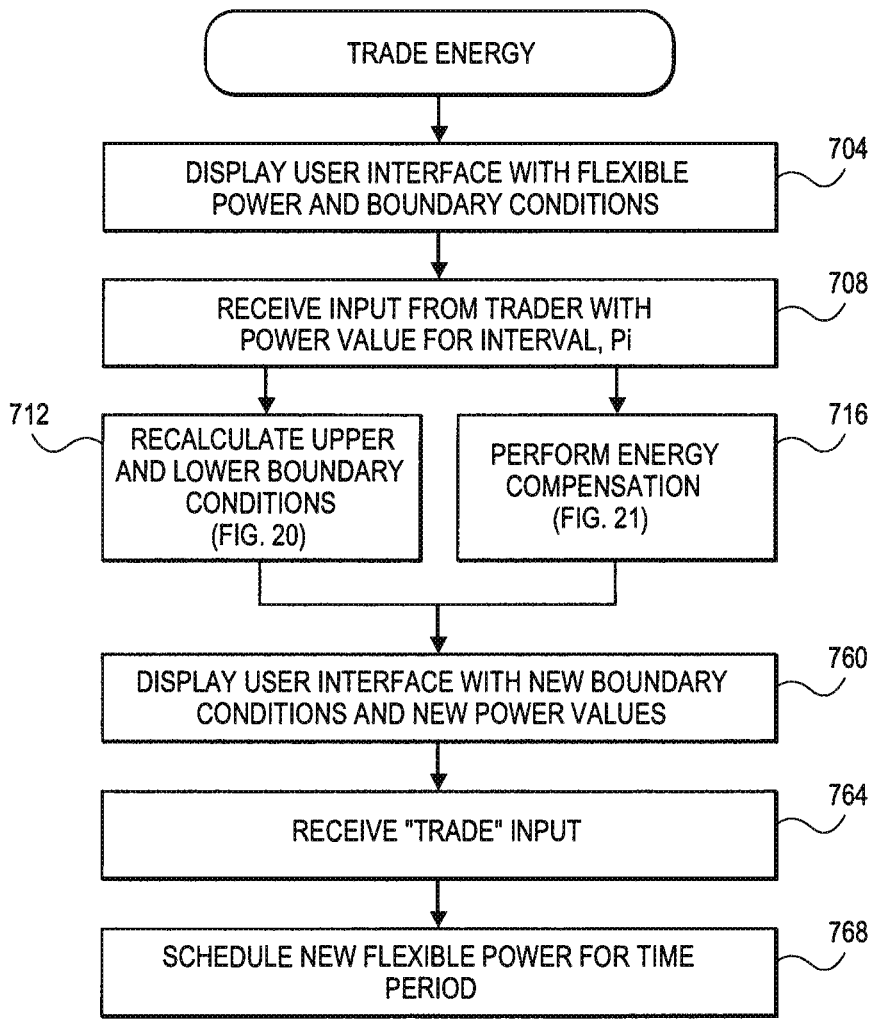
FIG. 19 is a flowchart describing one embodiment of automatic updates that occur to the user interface and how power is scheduled when a trade is executed.

FIG. 19 is a flowchart describing one embodiment of automatic updates that occur to the user interface and how power is scheduled when a trade is executed. Examples of energy trades are shown in FIGS. 16A, 16B, 17A and 17B. Advantageously, the boundary conditions are updated and energy compensation occurs automatically after each trade is made. The lag time to update the user interface will depend upon the portfolio of loads and the communications networks used. For example, it is predicted that for 1,000,000 laptops, or for 1,000 cold stores connected via fiber optics or over the Internet, the response time will typically be under 10 seconds.

In step 704 a user interface is displayed showing time intervals during a relevant time period (e.g., the current day, and/or the next day), boundary conditions showing the maximum levels for power that a virtual load may be asked to consume or to reduce (as the case may be), and flexible power input regions for each time interval that may be chosen by an energy trader. Examples of suitable user interfaces are shown in FIGS. 15-17, although any suitable user interface displayed on a computer screen that allows for user input would be acceptable.

In step 708 an energy trader realizes that there is an imbalance in his or her energy portfolio for a particular time interval or intervals, and decides to take advantage of the flexible power offered by the virtual load. Accordingly, the energy trader selects a time interval in which he or she desires that the virtual load should consume more power or consume less power, and then enters a power value for that particular interval. Technically speaking, the trader enters a number indicative of a power value, implying that the amount of energy consumed over the interval equals the power times the length of the interval.

In case the energy trader would like to modify multiple intervals, he may do on sequentially. The energy trader is constrained to only enter a power value P(i) that falls within the upper and lower boundaries for that interval; an invalid entry is not accepted by the system. Depending upon the needs of the energy trader, and the current upper and lower boundaries, the trader may enter a positive number (indicating that the virtual load should consume less power) or a negative number (indicating that the virtual load should consume more power).

Once the input is accepted by the system then two processes occur sequentially. First of all, in step 716 the system performs energy compensation by adjusting power values in the flexibility row whenever the overridden amount of energy consumption (i.e., the power value entered by the trader) together with the original reference curve does not yield behavior of the virtual load consistent with all boundary conditions. In the most typical case, compensation values will force all modified energy consumption to sum to zero. Note that if the system accepts the modified energy interval (as the value is between the boundaries) we know automatically that the energy consumption satisfies all constraints. This is by virtue of the construction of the upper and lower boundary conditions.

In step 712 the system recalculates all of the upper and lower boundary conditions for the entire time period taking into account the scheduled (and compensated) energy. In addition to recalculating boundary conditions during a trade, these conditions may also be recalculated when the state of resources change or when the virtual load changes. Step 624 provides more examples. Once these two processes are completed, in step 760 the user interface then displays to the trader the new boundary conditions and new values for power throughout the time period. Next, assuming that the trader is content with the new values displayed on the user interface, the trader clicks the "trade" button which is accepted by the system in step 764. In step 768 these new power values are then scheduled for the virtual load for the entire time period in accordance with FIG. 13. For example, the power levels required in step 540 will be the new power values for each time interval in the flexibility row.

Figure 20:
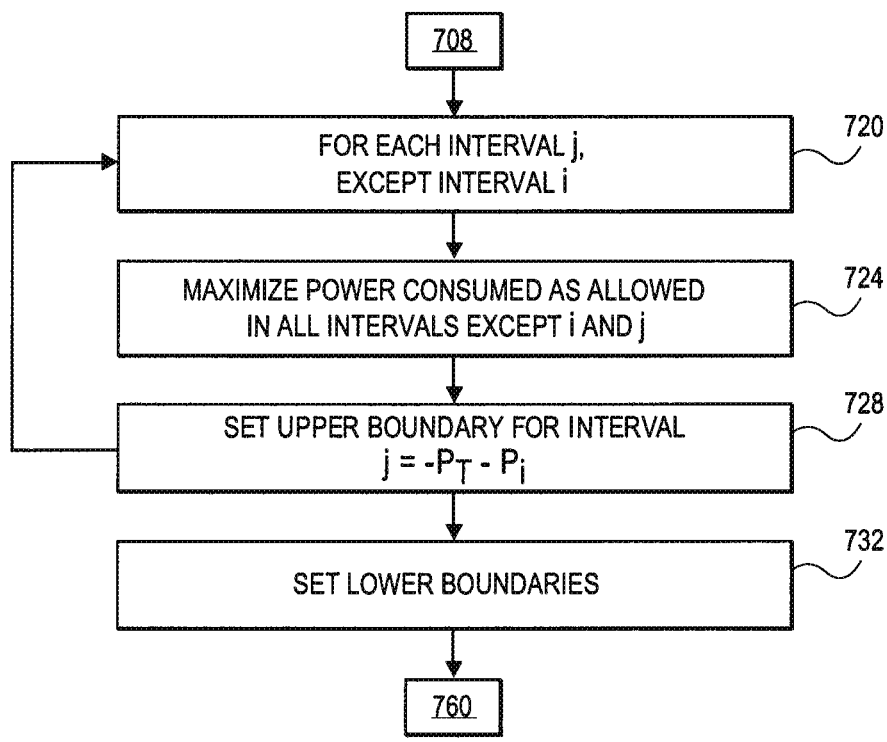
FIG. 20 implements step 712 from FIG. 19.

FIG. 20 implements step 712 from FIG. 19. Similar to the looping performed in FIG. 18 in order to initially set the boundary conditions, step 720 begins by defining a loop over each interval j within the time period, except for interval i which is the interval that the energy trader has just changed by inputting a desired power value. In this step, it is assumed that the only reason why boundary conditions have changed is the modification of the energy consumption in interval i. Hence, the only meaningful boundary conditions for that interval are the original ones.

Step 724 attempts to maximize the energy consumed as allowed in all intervals (except for intervals i and j) and may be performed as previously described in step 616. Once this total energy consumed, P(total), which is a quantity measured with respect to the reference curve, has been determined, in step 728 the upper boundary for interval j (i.e., the minimal energy that can be consumed measured relative to the reference curve) is set equal to −P(total)−P(i), where P(i) is the energy consumed in the i-th interval measured once again with respect to the reference curve. This formula indicates that the total power consumed within the time period has to remain constant. As noted earlier, if the constraints on the system are less restrictive, the above formula will be replaced so that the modifications on all intervals do not sum to zero but to the maximal amount that is allowed by the boundary conditions. In step 732 the lower boundaries for the flexibility table are recalculated in a similar fashion as per steps 720-728, and as modified by step 624 which was originally used to set the lower boundary conditions (i.e., maximize total power able to be reduced). In step 732 the lower boundary for each interval j will also be set to −P(total)−P(i). This is trivially generalized whenever energy is scheduled on multiple intervals.

Figure 21:
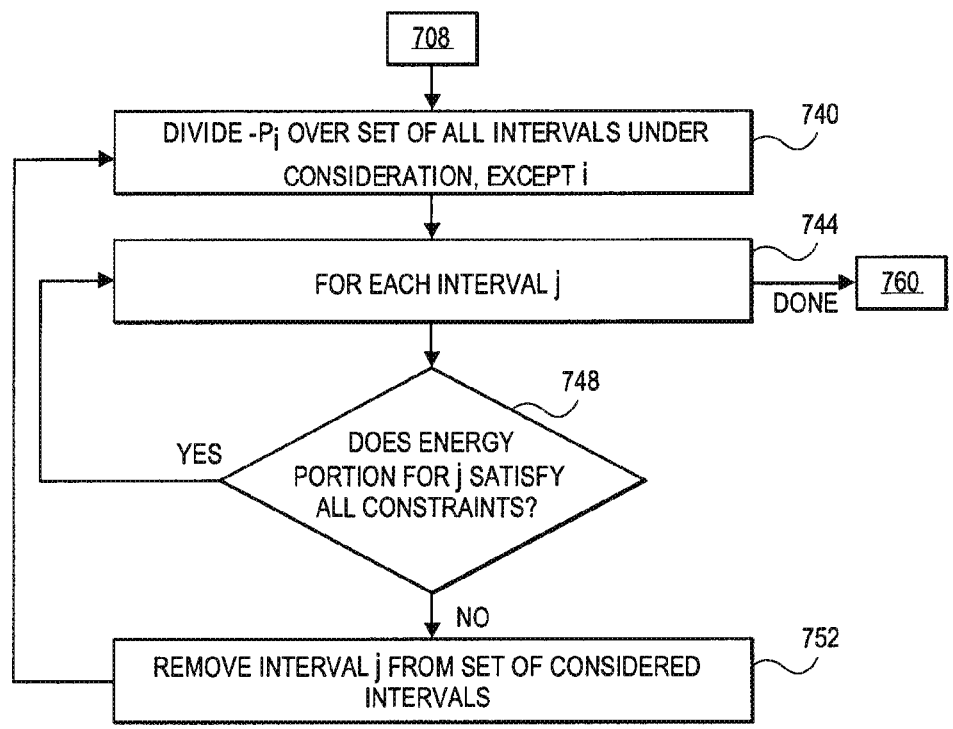
FIG. 21 implements step 716 from FIG. 19.

FIG. 21 implements step 716 from FIG. 19. As explained earlier, energy compensation is used to ensure that consumed energy remains constant for the virtual load over a given time period except for the case discussed above in which the constraints allow for more freedom. In that case, compensation might still occur whenever this is more optimal (i.e., whenever this leads to a higher value of the global value function).

This flow diagram may result in changes to the flexibility row 571. In step 740 the method begins by defining a current set of intervals under consideration. Initially, this set of intervals includes all time intervals within the time period except for the interval i which has just been modified by the energy trader. The negative of the power value selected by the trader is then evenly divided amongst all of the time intervals within this set. Next, step 744 begins a loop which iterates over all time intervals j within the current set of intervals.

Step 748 is a condition which tests whether that portion of divided energy recently assigned to interval j in step 740 satisfies all constraints for all loads within the virtual load. This is done by creating the control parameter schedules according to this new reference curve, evolving the system over the full load cycle (using the load model) and checking if at all times, all constraints are satisfied.

If all constraints are satisfied, then the test on the next interval is performed. If not, then in step 752 that particular interval j is removed from the current set of intervals under consideration and control returns to step 740. Once again, the negative of the power value is then divided amongst this new set of intervals under consideration and the loop starting at 744 begins again. Once all intervals have been processed in step 744 (and all constraints have been satisfied) then the final division of negative power values that satisfy all constraints will then be assigned to each of the intervals in the current set and displayed in the flexibility row in step 760. Because the power value chosen by the trader initially in step 708 fell within the boundary conditions for the interval, it is guaranteed that 716 will succeed and that it will be possible to find a solution by which compensating energy values are assigned to intervals other than interval i.

Rather than attempting to evenly distribute the remaining energy over the intervals as is done here during the compensation, another implementation distributes the energy in such a way as to minimize the negative economical impact on the energy player's portfolio. This impact would, once again, be computed using the value function.

Rescheduling of Power for Loads

Figure 22:
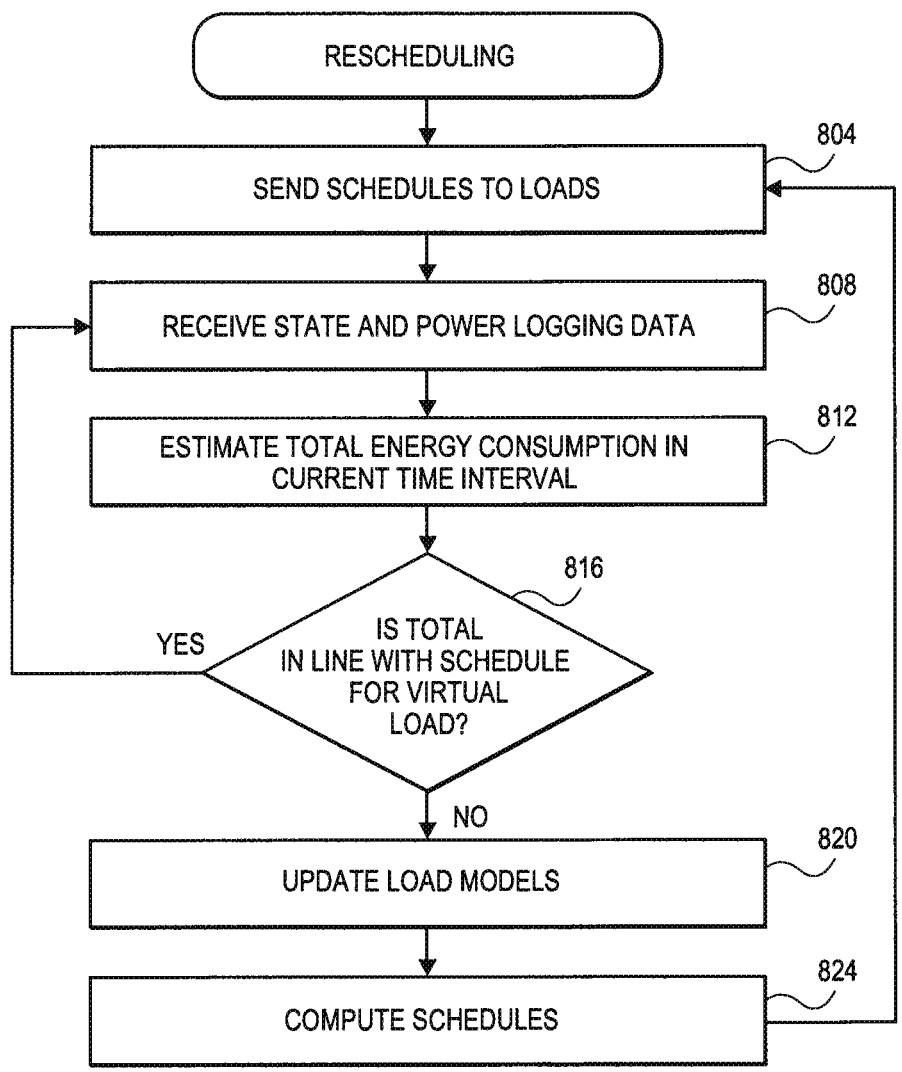
FIG. 22 is a flow diagram describing one embodiment by which rescheduling occurs within the energy management system.

FIG. 22 is a flow diagram describing one embodiment by which rescheduling occurs within the energy management system. Once an energy schedule has been sent to each of the individual loads within the virtual load it can be important to monitor the power consumption of each load with respect to the current schedule. For example, power consumption for a load that differs from what was originally forecast by the load will be penalized by a system operator. If a load owner is able to monitor power consumption within an interval, make corrections, and consume power according to the original forecast as much as possible, penalties will be avoided. Minimizing those penalties and improving the accuracy of the current schedule is desirable and is implemented using the following flow. Note that this rescheduling process is primarily a control procedure to make sure that the energy consumption within a time interval is as accurate as possible. Other processes have been described earlier that perform computations on the full time period (such as recomputation of the boundary conditions).

In step 804 an energy schedule is dispatched to the virtual load and then distributed via individual load schedules to each of the loads within the virtual load using the techniques previously described. Step 804 may be performed as part of this flow or may have been performed previously. In any case, at this point in time each load within the virtual load is executing its current schedule.

In step 808 state and power logging data is received from all loads within the virtual load by the control system 160. This data may be received, for example, using the specific control hardware described below or by using another implementation with network 170. Logging data is typically received every minute, but may be received less often or with greater frequency. Each load will report the amount of power currently being consumed by the load, the value of any state variables of the load, and the values of any other external parameters or other variables of interest. The state variables are typically those state variables used in the computer model for each individual load; the values of the state variables may also be calculated from other information received in the logging data.

In the case of a cold store, the external temperature can be relevant in determining why the power being consumed is different from that forecast. The external temperature may be different because of a glitch in its calculation, a poor forecast, a change in the weather, etc. In any case, there are a variety of reasons why a state variable or an external parameter may be different from originally thought and that difference may affect the power consumption of the load. Accordingly, it will be useful to correct for any discrepancy.

In step 812 the total energy consumption for the virtual load is estimated or determined for the current time interval. In a perfect world, each load of the virtual load would report on time its current energy consumption in step 808. But, some loads may report their energy consumption late or may not be able to report for a variety of reasons. For these loads missing consumption data, their energy consumption may be estimated by extrapolating an energy consumption level using energy consumption reported in previous reporting periods using the load model. In any case, once hard consumption data is received from any number of loads, and power consumption is estimated for the remaining missing loads, these values are summed together in order to provide an estimate of the total energy consumption for the time interval.

In step 816 it is determined whether this total energy consumption is in line with the current schedule (that is, the original reference curve plus any energy trades up until now) for the virtual load. The total for the virtual load is considered as deviations within each of the loads may cancel each other out. If energy consumption for the current time interval deviates from the reference curve originally supplied to the energy supplier (including any trades) the owner of the virtual load may incur significant penalties. In general, the error margin depends upon the particular energy market. One rule of thumb is that a deviation within about 10 kW hours would not count towards penalties. In general, though, power is measured by independent parties and can be compared to the actual forecast power, as such determining whether there is a deviation can vary.

If the total is in line, control moves to step 808 to await the receipt of new logging data. If not, then in step 820 various of the load models for individual loads are updated. A load model will be updated for a given load if its energy consumption for the time interval varies significantly from that which was predicted in the original reference curve for that load. A model may also be updated if the state variables for that load did not correspond to the prediction of the model, i.e., the load model was not originally well calibrated. To determine if energy consumption for an individual load differs from the original, an iteration is performed over all loads in step 820 to determine which load models need to be updated. This is done by comparing the predicted power consumption (i.e., that forecast by the model) to the actual logged power consumption.

To determine whether various state variables for particular loads are incorrect the predicted state variables (i.e., those forecast by the model) are compared to the actual logged state variables. If state variables for a particular load are significantly different than the logging data, then the calibration parameters are updated within the particular load model using the more correct values from the logging data. In one example, a battery may be charging more slowly or faster than expected and the internal state of charge may differ from the original state variable used in the load model. In this situation, it would be necessary to update this calibration parameter with a more correct value.

In one embodiment, the load model is also calibrated according to step 602 described above. As mentioned, load model calibration is performed by using all currently known conditions and parameters, resulting in a more accurate load model. By recalibrating the loads at this point in time using current information (such as the correct external temperature, the correct internal state of charge of the battery, etc.) the load model will become more accurate. The current information will have been received in step 808.

Next, in step 824 the individual load schedules are recomputed as has been described above. For example, the total power selected for the virtual load within each time interval is distributed to each of the loads using the techniques described in FIG. 13 wherein the inverse model for each load is used to map the power for each load into the correct control parameters and values for the entire time period. One advantage of the above flow diagram is that future forecasts will be improved because now the models are better tuned, and because this is a "self-learning" loop based on observed data. In addition, even if none of the load models have to be updated, computing the schedules again in step 824 will help compensate for the energy mismatch detected in step 816. For example, if too much energy was consumed during the first part of the time interval, computing the schedule again will yield a schedule that will force the load to use less energy in the latter part of the time interval, implying less energy use for the virtual load. In other words, not only is the mismatch in energy consumption fixed for the time period, but the underlying problem (an incorrect state variable perhaps) is fixed as well. For example, if the virtual load uses 1 MWh in the first few minutes of the time interval, and only 1.5 MWh were predicted to be used in that interval, then when the schedules are recomputed a value of 0.5 MWh will be supplied to the virtual load model as its control parameter for the remaining energy to be used in the current time interval. This technique assures that the virtual load will consume only that amount of power it had predicted in the original reference curve. Of course, load constraints may dictate that more power should be consumed. For instance, if it is a lot hotter than expected a cold store may consume more power than forecast in order to keep everything frozen.

Once a new schedule is computed for each load, it is possible that later time intervals will also have their energy consumption changed as well. For example, in the case of a cold store, if it has been hotter than expected in the first part of the time interval, the system may compensate by making the cold store work harder and become cooler in later time intervals. Of course, once the schedule is computed and power values change for later time intervals, steps 712 and 716 recalculation of boundary conditions for these later time intervals will occur and energy compensation may be triggered when the boundary conditions are sufficiently stringent.

Example of Coupling to Local Control Systems

Figure 23:
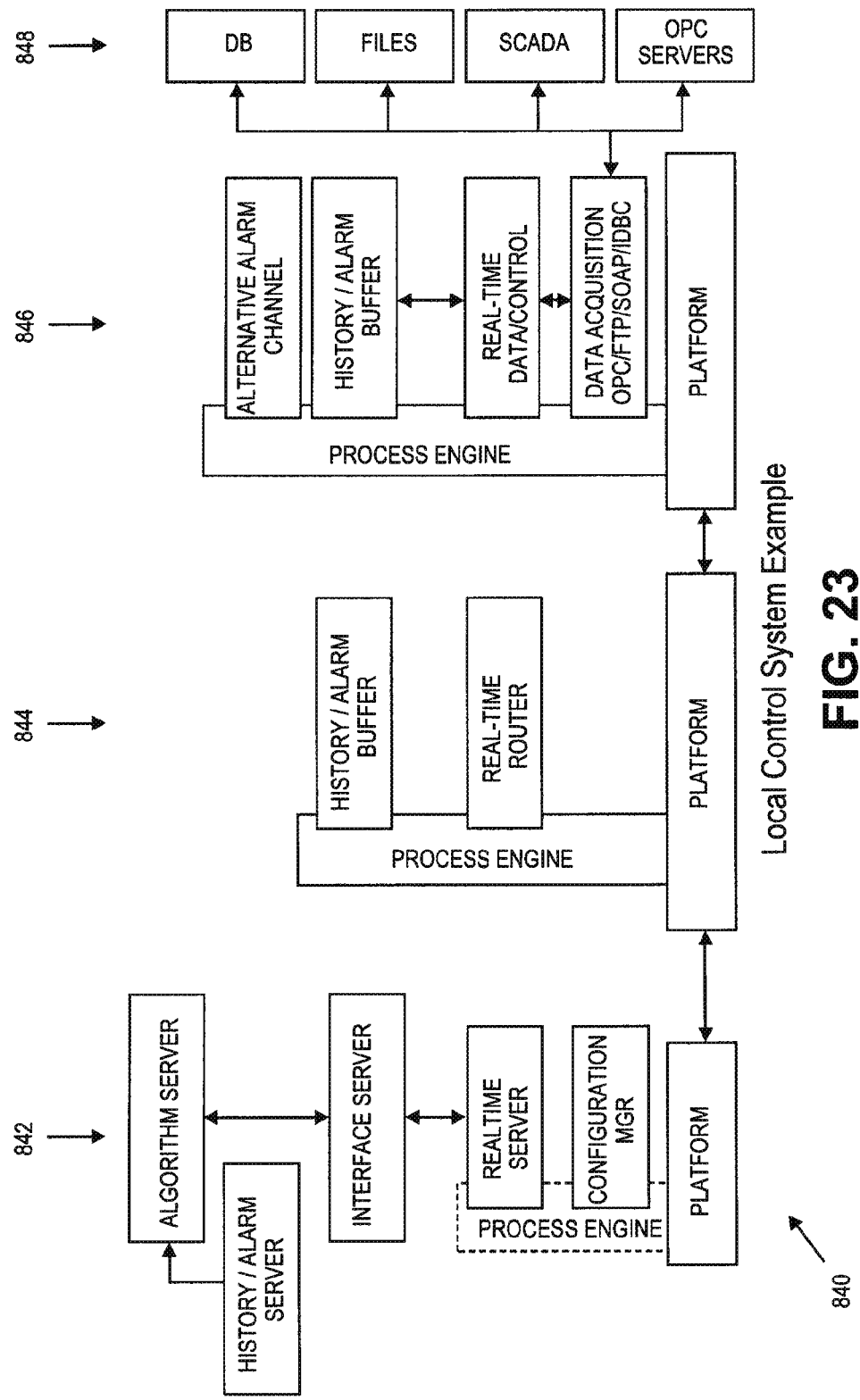
FIG. 23 is a block diagram of an exemplary local control system.

FIG. 23 is a block diagram of an exemplary control system 840. This control system allows the central control system 160 to deliver an energy schedule including control parameters and their values to individual loads and to receive feedback such as state logging data for each load. Of course, any of a variety of hardware implementations may be used to control individual loads and to receive feedback. In general, control system 160 may interface with any suitable Industrial Control System (ICS) used for industrial applications. For example, the natural gas industry makes broad use of local industrial control systems for distribution of natural gas (typically referred to as distribution control systems), or for the control of gas turbines used for power generation.

Subsystem 842 is one possible implementation of a portion of control system 160 that includes the algorithm and interface servers, a history server used for keeping all logged data (such as logged state variables, logged energy consumption, other events in the hardware or communication, etc.), a real-time server used for processing real time information flow and data, a configuration manager for network and communication configuration, in any suitable computer hardware and software for the platform and process engine.

Subsystem 844 is one possible implementation of a SCADA gateway that includes a history buffer for temporarily storing alarm and logged data, a real-time router for routing the information flow between the various components of the network, all implemented upon any suitable platform and process engine. Subsystem 846 is a possible implementation of a platform and process engine for local, on-site data processing. Included is an alternative alarm channel for communicating alarms through preferred communication channels, a history buffer, real-time data control, and any of a variety of data acquisition modules that will be known to those of skill in the art. Subsystem 848 includes any suitable industrial control system and its component parts such as OPC servers used for uniform communication (connected to devices such as a PLCs, DCS, RTUs, or a data source such as a database), and translating the data into a standard-based OPC format, SCADA software for data acquisition and supervisory control of the load(s), data files and databases. In one particular embodiment, each of the platforms of subsystems 842-846 may be implemented using an OPC unified architecture approach in which UA clients and servers are implemented upon each platform.

The information exchange with the loads may be set up using a local buffer managing the flow of data between the central control system 160 and each local control system (which may be implemented using a SCADA or MES system, a PLC, or simply a controllable power switch). Configuration is done on the local control system so that the optimal control parameters (as determined in the above methods) are used.

Extracting Power Flexibility from Internet Connected Devices

Figure 24:
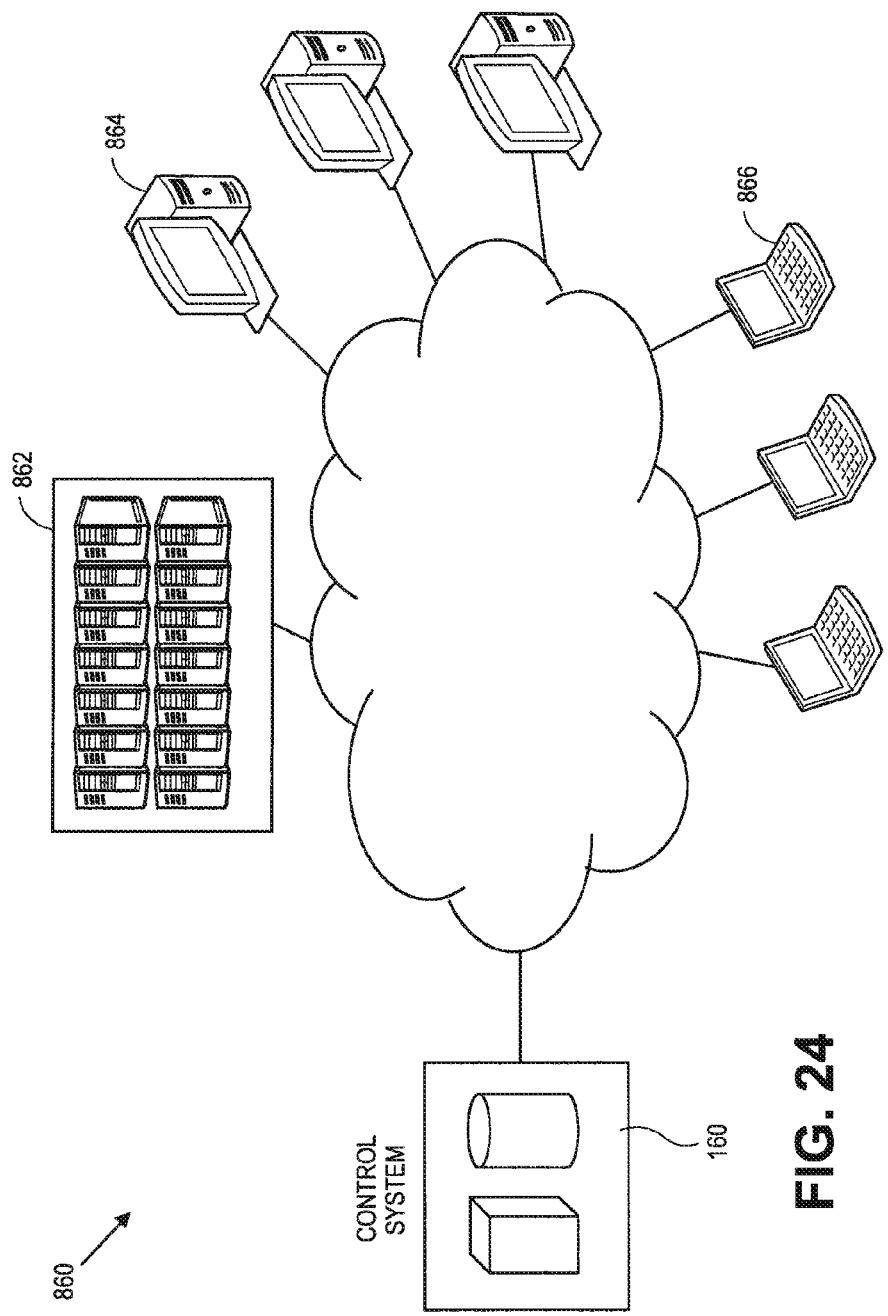
FIG. 24 illustrates an example energy management system for use with Internet-connected devices.

FIG. 24 illustrates an example energy management system 860 for use with Internet-connected devices. Shown are a variety of electrical loads including a data center 862, any number of desktop computers 864, and any number of mobile devices such as laptop computers, tablet computers, mobile telephones, etc. Electrical energy is consumed by all of these loads and these loads have all the required hardware and computing power to be able to monitor and control their energy consumption. Moreover, since they are all connected to the same global network, aggregation may be implemented by software running on internet-connected servers; this forms a particular implementation of the automated demand-response system described above. For fixed electrical loads such as data centres, desktop and server computers, these loads will generally be connected to an electricity source and their electricity supplier will be known, making it straightforward to perform aggregation into a virtual load as described above. For mobile devices, power steering is available when these devices are connected to a power source (typically when charging the battery), and the electricity supplier for these devices may default to a particular residence or business, or may be determined as described below. Of course, a data centre may also be handled as discussed above in the context of an industrial load.

This implementation uses the systems and methods described above in order to maximize the power flexibility of each load, aggregate these loads into a single virtual load, and then make the power and flexibility of the virtual load available through a user interface.

An initial step is to determine a set of constraints, control parameters and values for each load as discussed above. For these types of computing devices we determine, per load, a set of processes that can be scheduled. These processes are characterized by a given duration and power consumption profile and they have to obey various user constraints. For data centers these include: backup processes; migrating tasks from one center to the other (e.g., load balancing Web requests); and dynamically creating multiple instances of a single application. For desktop computers these include: running a virus scan; printing documents; and defragmenting hard drives. For portable devices these processes include charging the battery and interrupting current from the grid when the device has sufficient power to run on its battery. For all of these processes (which may be shared amongst categories of devices) we determine their constraints, power profile and (potential) impact on the lifetime of the hardware. Also, for these devices, we determine all the energy buffering they have present. For data centers this may be diesel generators used for back-up, with a specific ramp-up time and maximum running time. For laptops or other mobile devices, the buffer can be provided by a battery.

Next, using the flow of FIG. 9, for example, we determine which of those processes can be used to maximize the flexibility of the load. Indeed, the processes listed above translate into constraints, control parameters and values that can be used to steer the power consumption of the device. Each load will have constraints (e.g., a virus scan on a desktop computer should happen every Monday between 8 a.m. and 7 p.m.), and control parameters and values flow from those constraints such as starting a virus scan, pausing it, and ending the scan. A load model or power profile indicates how much extra power is required (or how much power is reduced) when a process is running (or when it is stopped), e.g., a virus scan requires 0.8 Wh that can be moved in time.

Once the loads, their processes and control parameters have been defined, these loads may then be aggregated into one larger virtual load as discussed above. Using an appropriate term in the global value function, the technique may schedule processes in such a way as to enhance the predictability of the power needs of the virtual load. For instance, the technique may include only a fraction of all available virus scans in the total flexibility to avoid the risk of a computer virus breakout triggering large amounts of unexpected scans and drains on power. This is integrated in the value function by adding a penalty term that would weigh the amount of computers not being able to run a virus scan (because scheduled into a flexibility trade) with the probability of a computer virus outburst.

One embodiment of this implementation uses a Web-downloadable plug-in software module that can be installed on a desktop computer, laptop or mobile telephone that communicates with the control system 160 in order to enable the central control system to do data acquisition, optimized aggregation, and power steering. The plug-in has various functionalities. A user interface shows a set of control and data acquisition actions that should be allowed in order for the load to offer power flexibility to the control system. The user interface also allows the user to enter user constraints about these actions and processes able to be controlled. Once these processes, constraints and control parameters are entered, the load comes online and may be used as part of a portfolio of internet-connected devices whose schedulable power is aggregated for use by energy players.

Another functionality is implementation of the different models used during the scheduling of the different computing processes. These models include: a data model to estimate the amount of data needed for each process; a computing model to estimate the duration of each process (given the amount of data); a power model to forecast the amount of power consumed by a given process (given its duration); and a user behavior model to define the constraints on each process. The plug-in also keeps a log of power consumption throughout the day for later settlement. The plug-in also has the ability to communicate the results of each model to the control system for processing the data, receive energy schedules from the control system, and to execute those energy schedules to implement the scheduled processes.

In the case of a mobile device such as a laptop, the laptop receives its power from its battery or from the grid, hence the battery acts as a local buffer. The plug-in monitors battery state-of-charge and power usage, thus the laptop is offered as a flexible load, which can be disconnected from the grid when demanded by the control software. The plug-in may also allow the user to choose a particular energy supplier via location of the device, a default location, etc. For data centers, the control system would typically interact with dedicated management software of the data center and would steer that software using the management software parameters or API.

Extracting Power Flexibility from a Natural Gas Load

FIG. 25 illustrates an example of a natural gas load 880 that may have its gas demand flexibly managed using techniques of the energy management system discussed above. Assume a gas-fired boiler 882 keeping a large volume of water 884 in between a certain temperature interval (i.e., temperature constraints). Natural gas arrives 886 from the gas distribution grid, is turned on or off by a remotely-controlled gas valve 888, and is lit using an automatic igniter 890. Hot water exits at 892 in order to supply residences or industrial processes. Other constraints or states may include the amount of water within the vessel, the pressure within the vessel, the amount of water being delivered via pipe 892, etc. Controlling this load is equivalent to controlling a cold store except that the internal state is enriched with parameters characterizing the gas flow in the burner. The central control system can interrupt the gas flow or turn the gas flow back on, making this load flexible, taking into account the temperature constraints.

Computer System Embodiment

Figure 26A:
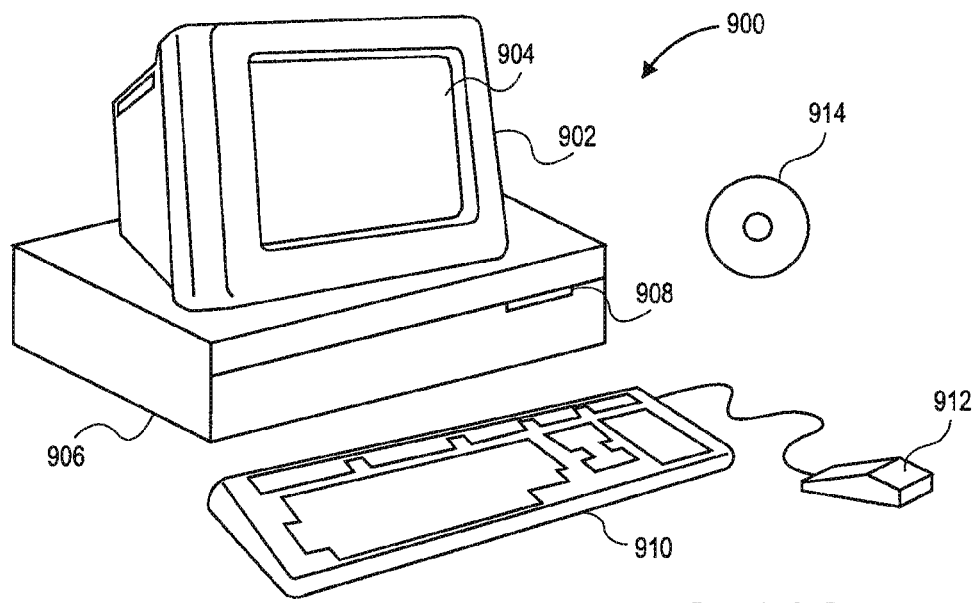
FIGS. 26A and 26B illustrate a computer system suitable for implementing embodiments of the present invention.
Figure 26B:
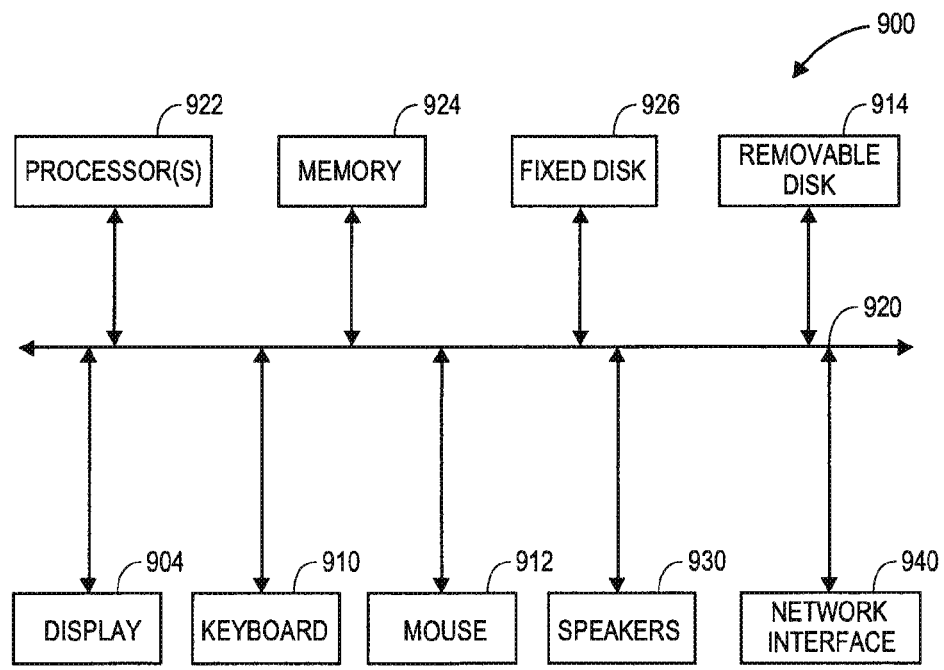

FIGS. 26A and 26B illustrate a computer system 900 suitable for implementing embodiments of the present invention. FIG. 26A shows one possible physical form of the computer system. Of course, the computer system may have many physical forms including an integrated circuit, a printed circuit board, a small handheld device (such as a mobile telephone or PDA), a personal computer or a super computer. The computer could also be a virtualized system as is typically the case in cloud architectures. Computer system 900 includes a monitor 902, a display 904, a housing 906, a disk drive 908, a keyboard 910 and a mouse 912. Disk 914 is a computer-readable medium used to transfer data to and from computer system 900.

FIG. 26B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Note that in case a virtual server is used, many of the components mentioned above would be simulated by the virtualization software. As an example, the CPU of the virtual system is a piece of software that would delegate computation tasks to a physical CPU on the machine running the virtualization software in a predefined manner.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of rescheduling energy for a virtual energy load, said method comprising:
computing an energy schedule for said virtual load, said energy schedule indicating an energy level to be consumed by said virtual load for each of a plurality of time intervals within a time period, said virtual load representing a plurality of actual energy loads;
distributing an individual control schedule to each of said actual loads such that said actual loads in total consume energy according to said energy schedule;
receiving power logging data from at least one of said actual loads during a current one of said time intervals, said power logging data indicating an amount of energy consumed by said at least one of said actual loads in said current time interval;
estimating a total energy consumption of said virtual load in said current time interval;
comparing said total energy consumption with said energy level from said energy schedule for said current time interval;
recomputing said individual control schedules using an updated value for said energy level for said current time interval;
distributing said recomputed individual control schedules among said actual loads, whereby each actual load receives its recomputed individual control schedule and whereby said actual loads in total consume energy according to said energy schedule;
recalibrating a load model for each of said actual loads using logged state variables for each of said actual loads received during said current time interval, wherein said recomputing includes using an inverse model for each of said recalibrated load models in order to output said recomputed individual control schedules; and
controlling said actual loads during said time period using said recomputed individual control schedules.

2. A method as recited in claim 1 wherein each actual load operates under a set of constraints, said method further comprising:
controlling each of said actual loads using its individual control schedule while following said set of constraints for said each actual load.

3. A method as recited in claim 1 further comprising:
performing said steps of receiving, recomputing and distributing said recomputed individual control schedules during said current time interval.

4. A method as recited in claim 1 wherein said recomputing includes inputting a power for each load into an inverse model for each load in order to output said recomputed individual control schedules; and
controlling each actual load during said time period using said recomputed individual control schedules.

5. A method as recited in claim 1 further comprising:
updating a load model for one of said actual loads, wherein said recomputing includes inputting a power for said one of said actual loads into an inverse model of said updated load model in order to output said recomputed individual control schedule for said one of said actual loads; and
controlling said one of said actual loads during said time period using said recomputed individual control schedule.

6. A method as recited in claim 1 further comprising:
determining if a deviation exists between said total energy consumption and said energy level from said energy schedule for said current time interval.

7. A method as recited in claim 1 further comprising:
submitting said energy schedule to a system operator as a reference curve.

8. A method as recited in claim 1 wherein said recomputed individual control schedules assure that said virtual load will consume only said energy level for said current time interval during said current time interval.

9. A method as recited in claim 1 wherein each of said actual energy loads are in geographically distributed locations and have different owners.

10. A method as recited in claim 1 wherein said virtual load is not an actual energy load that consumes energy.

11. A method as recited in claim 1 wherein said updated value is a difference between said energy level for said current time interval and said total energy consumption.

12. A method as recited in claim 1 wherein said actual loads in total consuming energy according to said energy schedule includes consuming energy within about 10 kW-hours of said energy level in said energy schedule for said current time interval.

13. A method as recited in claim 1 wherein said energy schedule is dictated by an energy player external to and outside control of an owner of said actual energy loads.

* * * * *